(12) United States Patent
Wright et al.

(10) Patent No.: US 11,361,359 B2
(45) Date of Patent: Jun. 14, 2022

(54) METHODS SYSTEMS AND COMPUTER PROGRAM PRODUCTS FOR SPECIFICATION DATA MANAGEMENT AND GENERATION OF ELECTRONIC BILL OF MATERIAL

(71) Applicant: SPECRIGHT, INC., Irvine, CA (US)

(72) Inventors: Matthew P. Wright, San Juan Capistrano, CA (US); Ayman Shoukry, Irvine, CA (US)

(73) Assignee: SPECRIGHT, INC., Irvine, CA (US)

( * ) Notice: Subject to any disclaimer, the term of this patent is extended or adjusted under 35 U.S.C. 154(b) by 72 days.

(21) Appl. No.: 16/746,679

(22) Filed: Jan. 17, 2020

(65) Prior Publication Data

US 2021/0224878 A1    Jul. 22, 2021

(51) Int. Cl.
*G06Q 30/00* (2012.01)
*G06Q 30/06* (2012.01)

(52) U.S. Cl.
CPC ................ *G06Q 30/0627* (2013.01)

(58) Field of Classification Search
None
See application file for complete search history.

(56) References Cited

U.S. PATENT DOCUMENTS

| | | | | |
|---|---|---|---|---|
| 5,311,424 A * | 5/1994 | Mukherjee | ........... | G06Q 10/087 705/29 |
| 5,434,791 A * | 7/1995 | Koko | ................... | G06Q 10/087 700/97 |
| 2004/0019538 A1 | 1/2004 | Ballas et al. | | |
| 2004/0210467 A1* | 10/2004 | Yokoyama | ....... | G06Q 10/06314 705/7.24 |
| 2006/0052895 A1* | 3/2006 | Woehler | ................. | G06Q 10/08 700/107 |

(Continued)

OTHER PUBLICATIONS

Linda L. Zhang et al. "A knowledge-based system for process family planning" Journal of Manufacturing Technology Management vol. 24 No. 2, 2013 pp. 174-196 © Emerald Group Publishing Limited (Year: 2013).*

(Continued)

*Primary Examiner* — Naeem U Haq
(74) *Attorney, Agent, or Firm* — Vista IP Law Group LLP

(57) ABSTRACT

Computer-implemented methods, computing systems and computer program products for centralized product specification management. A specification management application reads or receives an electronic specification family record stored in a data store. The specification family record includes a data structure of connected product specifications defining product attributes applicable to multiple products. The application also reads or receives a separate or independent product specification that defines product attributes that are not in the electronic specification family record. Electronic bills of material (BOMs) are generated for a user of the specification management application by the application aggregating product specifications of the electronic specification family record and at least one electronic independent product specification such that the electronic BOM includes respective product attributes defined by respective connected and unconnected product specifications. Specification changes are propagated to updated or create new BOMs.

54 Claims, 25 Drawing Sheets

(56) References Cited

U.S. PATENT DOCUMENTS

| | | | |
|---|---|---|---|
| 2006/0155407 A1* | 7/2006 | Azuma | G06F 30/00 700/105 |
| 2006/0253403 A1 | 11/2006 | Stacklin et al. | |
| 2011/0173103 A1 | 7/2011 | Batra et al. | |
| 2013/0006408 A1 | 1/2013 | Zakrzwski et al. | |
| 2014/0278693 A1 | 9/2014 | Zhang et al. | |

OTHER PUBLICATIONS

PCT International Search Report for PCT/US2020/067539, Applicant: Specright, Inc., dated Mar. 29, 2021 (3 pages).

PCT Written Opinion of the International Search Authority for PCT/US2020/067539, Applicant: Specright, Inc., dated Mar. 29, 2021 (7 pages).

* cited by examiner

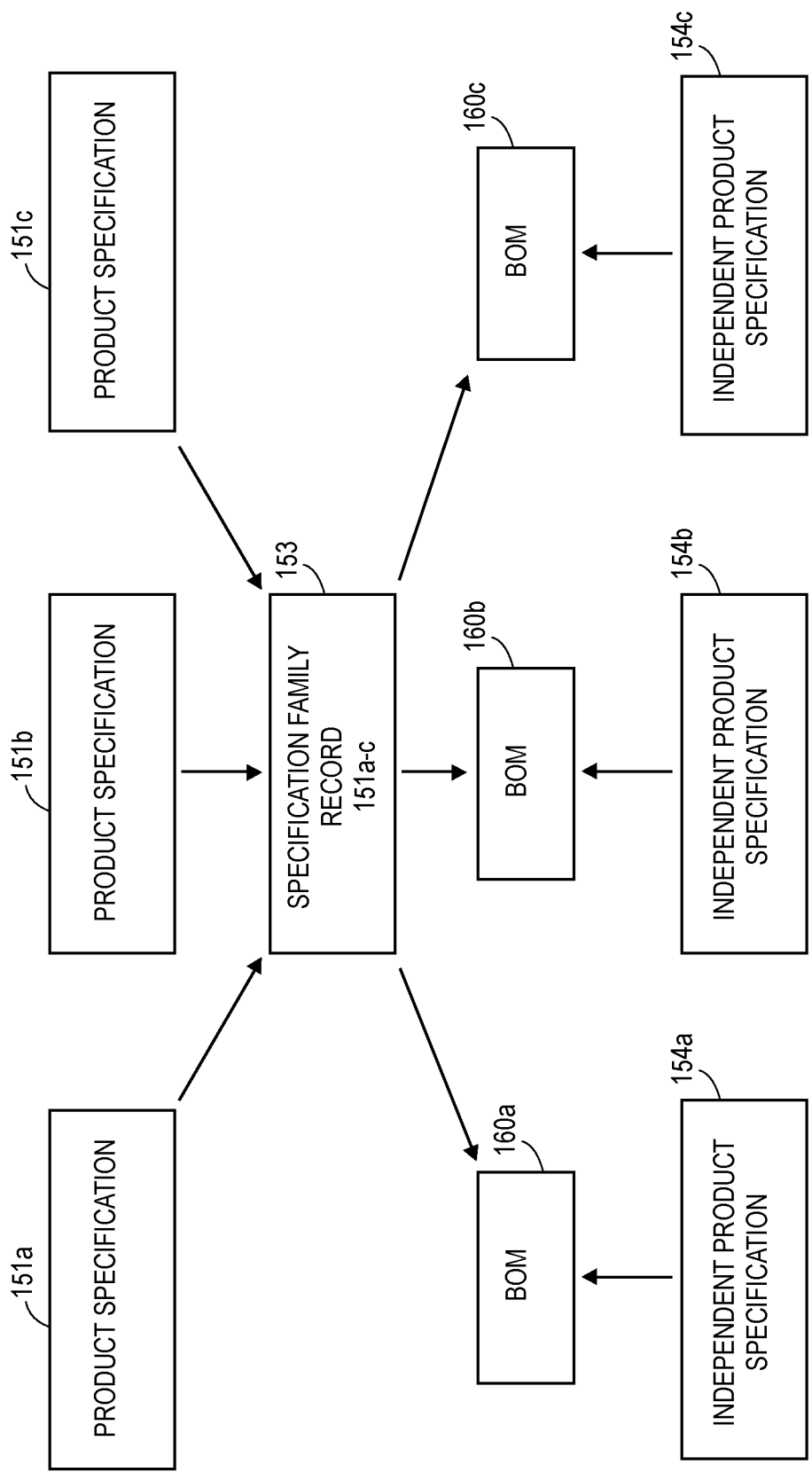

FIG. 8A

Create Bottle Structure Spec —151a

SPECRIGHT
SPECRIGHT HOME   FINISHED GOODS ∨ PACKAGING ∨   INGREDIENTS ∨   FORMULAS ∨   SUPPLIERS ∨   QUALITY ∨   LIKE ITEM FINDER ∨   REPORTS ∨   DASHBOARDS ∨   PRODUCT DEVELOPMENT ∨   EXCHANGE ∨

PACKAGING
BOTTLE123                                                                                                 [EDIT] [DELETE] [CLONE]

UNIQUE FILES (0)   WHERE USED (1)   HISTORY (0)   APPROVAL HISTORY (0)

DETAILS   RELATED

| | | | |
|---|---|---|---|
| INTERNAL PART ID | BOTTLE123 | OWNER | SPECRIGHT TEAM |
| SPEC NAME | SPRING WATER BOTTLE SPEC | RECORD TYPE | BOTTLE |
| STATUS | APPROVED | MASTER/SUPPLIER | MASTER |
| UPC | | MASTER SPECIFICATION | |
| LAST VIEW BY | SPECRIGHT TEAM | SUPPLIER | |

∨ IDENTIFICATION DETAILS
PRIOR PART IDS

∨ STRUCTURE
| | | | |
|---|---|---|---|
| MATERIAL | PET | DESCRIPTION | |
| SHAPE | CYLINDER | DECLARED FILL | |
| COLOUR | CLEAR | BRIMFUL CAPACITY | |
| FINISH | | WALL THICKNESS | |
| SEAL/CLOSURE | CAP | HEIGHT | |
| NECK FINISH | 45 | HEIGHT TOLERANCE | |
| RECYCLE SYMBOL | #1 PET | WIDTH | |
| MASTER BATCH TYPE | | WIDTH TOLERANCE | |
| ADDITIVE | | TOP LOAD - MIN | |
| DECORATION | | SIDE LOAD - MIN | |
| SPECIAL INSTRUCTIONS (STRUCTURE) | | | |

∨ PRINT
| | | | |
|---|---|---|---|
| TYPE OF PRINT | DIGITAL | TYPE OF INK | |
| NUMBER OF COLORS | | PRINTED # OF SIDES | |
| # IMPRESSIONS | | PRINT SIDE | |
| REPEAT | | OPACITY | |
| NUMBER ACROSS | | PRINT COATINGS | |

UNIQUE FILES (1)
UF-000028
SPEC FILE NAME:   BOTTLE TECHNICAL DRAWING
DAYS BEFORE EXPIRATION:
EXPIRATION DATE:
VIEW ALL

WHERE USED (1)
SPRING WATER
SPECIFICATION COUNT:   2
SPEC FAMILY RECORD TYPE: SPEC BOM
VIEW ALL

HISTORY (0)

APPROVAL HISTORY (0)

Create Bottle Structure Spec — 151b

SPECRIGHT — SPECRIGHT HOME · FINISHED GOODS ∨ · PACKAGING ∨ · INGREDIENTS ∨ · FORMULAS ∨ · SUPPLIERS ∨ · QUALITY ∨ · LIKE ITEM FINDER ∨ · REPORTS ∨ · DASHBOARDS ∨ · PRODUCT DEVELOPMENT ∨ · EXCHANGE ∨

PACKAGING / L100 — 810b

[ EDIT | DELETE | CLONE ▼ ]

▸ UNIQUE FILES (0) | ▸ PRINT CONNECTION (1) | ▸ INBOUND MATERIAL (0) | ▸ OUTBOUND MATERIAL (0) | ▸ WHERE USED (2) | ▸ DOCUMENTS (0) | ▸ HISTORY (1) | ▸ APPROVAL HISTORY (2)

DETAILS | RELATED

| Field | Value |
|---|---|
| INTERNAL PART ID | L100 |
| SPEC NAME | MASTER SHIPPING LABEL |
| STATUS | APPROVED |
| UPC | |

˅ IDENTIFICATION DETAIL
PRIOR PART IDS

˅ STRUCTURE
| Field | Value |
|---|---|
| STYLE | |
| MATERIAL | |
| SUBSTRATE | |
| PLACEMENT/LOCATION | |
| LINER COATINGS | WAX ALTERNATIVE |
| ADHESIVE | |
| WINDING DIRECTION | |
| SHELF LIFE | |
| STORAGE | |
| SPECIAL INSTRUCTIONS (STRUCTURE) | |

˅ PRINT
| Field | Value |
|---|---|
| TYPES OF PRINT | FLEXO |
| NUMBER OF COLORS | 3 |
| # IMPRESSIONS | |
| REPEAT | |
| NUMBER ACROSS | |
| SPECIAL INSTRUCTIONS (PRINT) | |

| Field | Value |
|---|---|
| OWNER | |
| RECORD TYPE | LABEL |
| MASTER/SUPPLIER | SUPPLIER |
| MASTER/SPECIFICATION | |
| SUPPLIER | ACME |
| DESCRIPTION | |

OVERALL NET DIMENSIONS
| Field | Value |
|---|---|
| LENGTH | 4.0000 |
| WIDTH | 6.0000 |
| CORNER RADIUS | |
| AREA | |
| QUANTITY PER REEL | |
| CORE DIAMETER | |
| MAX ROLL OD | |

| Field | Value |
|---|---|
| TYPE OF INK | PMS |
| PRINTED # OF SIDES | 2 |
| PRINT SIDE | SURFACE |
| OPACITY | |
| PRINT COATINGS | |

Owner: ⊙ SPECRIGHT TEAM

---

▸ UNIQUE FILES (0)

▸ PRINT CONNECTION (1)
SPRING WATER LABEL PRINT
VIEW ALL

▸ INBOUND MATERIAL (0)

▸ OUTBOUND MATERIAL (0)

▸ WHERE USED (2)
FROZEN CHICKEN SANDWICHES
SPECIFICATION COUNT: 6
SPEC FAMILY RECORD TYPE: SPEC BOM
SPRING WATER
SPECIFICATION COUNT: 2
SPEC FAMILY RECORD TYPE: SPEC BOM
VIEW ALL

▸ DOCUMENTS (0)

▸ HISTORY (1)
UPDATED
DATE: 9/23/2019 3:23 PM
USER: SPECRIGHT TEAM
VIEW ALL

▸ APPROVAL HISTORY (2)
STEP 1
DATE: 9/23/2019 3:23 PM
STATUS: APPROVED
ASSIGNED TO: SPECRIGHT TEAM
ACTUAL APPROVER: SPECRIGHT TEAM

Create Water Formula Spec — 800c

SPECRIGHT
::: SPECRIGHT HOME  FINISHED GOODS ˅  PACKAGING ˅  INGREDIENTS ˅ FORMULAS ˅ SUPPLIERS ˅  QUALITY ˅  LIKE ITEM FINDER ˅  REPORTS ˅  DASHBOARDS ˅  PRODUCT DEVELOPMENT ˅  EXCHANGE ˅

ALL ˅ SEARCH SALESFORCE — 151c / 810b

FORMULA
WAH2O

EDIT | DELETE | CLONE ▸

RELATED  DETAILS

| | | | |
|---|---|---|---|
| INTERNAL PART ID | WAH2O | OWNER | SPECRIGHT TEAM |
| FORMULA NAME | SPRING WATER H₂O | STATUS | APPROVED |
| FORMULA TOTAL % | 100.00% | ODOR | |
| SUPPLIER | ACME | APPEARANCE | |

˅ IDENTIFICATION DETAIL

DESCRIPTION  FORMULA FOR OUR FRESH SPRING WATER.

˅ ALLERGENS & CLAIMS

| | | | |
|---|---|---|---|
| ALLERGENS | | CLAIMS | VEGAN;NON-GMO |
| GLUTEN-FREE | ☑ | VEGAN | VEGAN |

˅ PURCHASING

QUANTITY PER YEAR  25,000,000
PRICE PER YEAR  $0.00

˅ COMMENTS

COMMENTS

CREATED BY  SPECRIGHT TEAM, 8/8/2019 11:07 AM     LAST MODIFIED BY  SPECRIGHT TEAM, 8/8/2019 11:09 AM

---

FINISHED GOODS (1)

SPRING WATER H₂O
FORMULA NAME:     SPRING WATER H2O
FINISHED GOOD:    SPRING WATER
COUNT:            1.0000

VIEW ALL

INGREDIENTS TO FORMULAS (2)

SPRING WATER MAGNESIUM CHLORIDE
INGREDIENT NAME:  MAGNESIUM CHLORIDE
SUPPLIER:         MONTANA ORGANICS
STATUS:

SPRING WATER H₂O
INGREDIENT NAME:  WATER
SUPPLIER:         NUTRIFROST
STATUS:           APPROVED

VIEW ALL

Finished Product - BOM —160

FIG. 8D

SPECRIGHT  810c
::: SPECRIGHT HOME | FINISHED GOODS ∨ PACKAGING ∨ INGREDIENTS ∨ FORMULAS ∨ SUPPLIERS ∨ QUALITY ∨ LIKE ITEM FINDER ∨ REPORTS ∨ DASHBOARDS ∨ PRODUCT DEVELOPMENT ∨ EXCHANGE ∨

FINISHED GOOD
SPRING WATER

ALL ▼ | SEARCH SALESFORCE

EDIT | DELETE | CLONE ▼

DETAILS

| | | | |
|---|---|---|---|
| FINISHED GOOD NAME | SPRING WATER | OWNER | ⊙ SPECRIGHT TEAM |
| DESCRIPTION | PURIFIED SPRING WATER. | RECORD TYPE | SPEC BOM |
| | | STATUS | IN PROCESS |

FG IMAGE
IMAGE

> MASTER DETAILS
> SHIPPING INFORMATION
> SYSTEM INFORMATION

PACKAGING SPECIFICATIONS
2 ITEMS. SORTED BY SPECIFICATION. UPDATED A FEW SECONDS AGO.

| | SPECIFICATION ↑ | ∨ SPEC NAME | ∨ QUANTITY | ∨ SPECIFICATION COMMODITY ∨ |
|---|---|---|---|---|
| 1 | BOTTLE123 — 151a | SPRING WATER H₂O | | BOTTLE |
| 2 | L100 — 151b | MASTER SHIPPING LABEL | | LABEL |

VIEW ALL

FORMULAS
1 ITEM. UPDATED A FEW SECONDS AGO.
FINISHED GOODS TO FORMULA... ∨ FORMULA ∨ FORMULA NAME ∨ COUNT ∨ PRICE PER UNIT ∨

| 1 | SPRING WATER H₂O | WAH₂O — 151c | SPRING WATER H₂O | 1.0000 | |

VIEW ALL

QUALITY
0 ITEM. UPDATED A FEW SECONDS AGO.

NEW | CHANGE OWNER

UNIQUE FILES
0 ITEM. UPDATED A FEW SECONDS AGO.

NEW | CHANGE OWNER

HISTORY

CHANGE OWNER

800d

METHODS SYSTEMS AND COMPUTER PROGRAM PRODUCTS FOR SPECIFICATION DATA MANAGEMENT AND GENERATION OF ELECTRONIC BILL OF MATERIAL

FIELD OF THE INVENTION

Embodiments relate to computerized database systems and methods, and more particularly, to cloud-based product specification data management systems and methods for generating electronic bills of material.

BACKGROUND

A bill of material (BOM) may include various details about a product and its manufacture such as product materials, structure, ingredients and components and packaging materials and structure and dimensions. A BOM may be used to communicate information about various types of products ranging from food and beverage products to beauty and cosmetic products and retail packaged products.

The types of information included in a BOM are product specific. For example, a BOM for bottled water may specify bottle materials, shape and dimensions, cap materials, shape and dimensions, ingredients, flavorings, nutrition, quantity, labels, etc. There are many, if not millions, of BOMs generated for various products when considering the details or specifications about the vast number of products in commerce, and these BOMs are generated and communicated using different platforms and programs. For example, one company may generate a BOM using a spreadsheet program, while another company uses a word processing document, and yet another company uses an electronic mail application, and yet another company utilizes a product lifecycle management (PLM) program such as those available from Oracle and SAP.

Disadvantages of conventional programs and platforms not only include the substantial disparities among the various programs, platforms, formats and accessibility, but they also involve operational inefficiencies since they are configured to execute in a linear, top down manner. In other words, such systems begin with a user defining the product and then working from that starting point to break down the defined product and specify each individual product detail for each product variety such that resulting BOMs for each product are independent of each other and include duplicate and disconnected product specifications. Disadvantages and inefficiencies of conventional systems and methods are compounded when considering the millions of different specifications generated for many different products, while doing so with different platforms and systems.

For example, continuing with an illustrative example of a bottled water product, and with reference to FIG. 13A, known platforms or programs involve first defining the final product (bottled water with flavor A), then a bill of material (BOM 1) 1310*a* for that flavored bottled water product is generated. Specifications 1320*a-d* are added to the previously generated BOM1 1310*a*. In the illustrated example, the specifications include Specification 1 1320*a* for flavor A, Specification 2 1320*b* for water ingredients, Specification 3 1320*c* for cap details, and Specification 4 1320*d* for bottle structure. As shown in FIG. 13A, all of Specifications 1320*a-d* are disconnected and independent of each other such that there is no link between the specifications. Similarly, referring to FIG. 13B, for a different variety of bottled water with flavor B, the same procedure is followed—the final product (bottled water with flavor B) is first defined, then a second bill of material (BOM2) 1310*b* for that flavored bottled water product is generated, and then specifications 1320*e-h* are added to previously generated BOM 2 1310*b*. Continuing with the example above, the disconnected and independent product specifications 1320*e-h* added to previously generated BOM 2 1320*b* include Specification 5 1320*e* for flavor B, Specification 6 1320*f* for water ingredients, Specification 7 1320*g* for cap details, and Specification 8 1320*h* for bottle structure. Similarly, referring to FIG. 13C, for a third flavor variety, the same protocol is followed—the final product (bottled water with flavor C) is first defined, then a third bill of material (BOM3) 1310*c* for that flavored bottled water product is generated, and then specifications 1320*i-l* are added to previously generated BOM3 1310*c*. Continuing with the example as illustrated, the disconnected and independent product specifications 1310*i-l* added to BOM3 1310*c* include Specification 9 1320*i* for flavor C, Specification 10 1320*j* for water ingredients, Specification 11 1320*k* for cap details, and Specification 12 1320*l* for bottle structure.

SUMMARY

Embodiments relate to computerized specification data management in networked computing systems and methods for generating an electronic bill of material (BOM).

Embodiments are also related to a computer or network based system and method for generating and automatically modifying generated electronic BOMs to ensure that electronic BOMs are current and accurate when product specifications are changed.

Embodiments are also related to bottom up generation of an electronic BOM such that a user is not required to initially specify the product or initially generate a BOM.

Embodiments are also related to connected or linked product specification data structures and specification management applications and systems that identify specifications applicable to multiple products.

Embodiments also provide for more efficient specification data storage and processing and more flexible, efficient and customizable product design that can quickly adapt to product design changes.

Embodiments also relate to cloud-based specification management systems and methods, e.g., as Platform as a Service (PaaS) and Software as a Service (SaaS) implementations. Embodiments also relate to centralized specification management systems and methods that allow multiple different users to access respective accounts and generate electronic BOMs for respective products and for selective user restrictions on access and modifications (e.g., read only access for third parties such as a user's suppliers and manufacturers). Embodiments also relate to centralized specification management systems and methods that account for product specifications provided from different geographic computing devices at locations and integration of product specifications received from different computing devices into a single user account and respective connected data structures.

Embodiments also relate to specification management applications and systems that provide for intelligent and automated specification data management and improved and more efficient database systems and operation.

Embodiments also relate to providing for more efficient data store utilization and real-time user alerts regarding duplicate product specifications and preventing product specification replication for improved database operation and reduced processing and interactions with product specifications by identifying and safeguarding against duplicate product specifications.

Embodiments also relate to increasing the speed and efficiency of product specification management and generation of electronic BOMs and generation of electronic BOMs by "many to many" data structures including connected product specifications.

Embodiments also relate to data structures used for specification data management, and in particular, to connected or linked data structures for specification data management. Thus, embodiments are in contrast to "linear" or stand-alone conventional systems that generate independently generate bills of material with respective independent sets of product specifications.

One embodiment of a computerized specification method comprises a specification management application (e.g., executed as a cloud application) executing computer-readable instructions stored in non-transitory memory to access a data store and read or receive an electronic specification family record stored in the data store. The electronic specification family record includes or is configured as a data structure of connected product specifications. A product specification defines or includes one more product attributes, and product specifications of the generated electronic specification family record are applicable to multiple products. Examples of product attributes include a product design (including product components, materials, structure or shape, dimensions, labels, and operation) and product packaging design (including packaging materials, structure or shape, dimensions, labels, operation and components), ingredients or composition, etc.

As an illustrative example in the food and beverage industry, embodiments may be executed to manage specifications for a flavored water product and may include product specifications for the bottle, cap, label, ingredients or flavorings (such as unflavored, lemon and sparking varieties). The specification management application executes computer-readable instructions to access or receive respective electronic independent product specifications. An independent product specification is separate from, or a stand-alone specification relative to, the electronic specification family record, and may, for example, define a product attribute that is selected or specified by the user of specification management application. Respective electronic independent product specifications define respective product attributes that are applicable to a product of the product family but are not included in the electronic specification family record. The specification management application executes computer-readable instructions to generate respective electronic BOMs for respective products for a user of the specification management application. An electronic BOM is generated according to embodiments by the specification management application aggregating product specifications of the electronic specification family record and at least one electronic independent product specification such that the electronic BOM includes respective product attributes defined by respective connected product specifications of the electronic specification family record and at least one product attribute defined by at least one electronic independent product specification.

Another embodiment is related to specification management computing systems, which may comprising a cloud-based, intermediate computing system executing a specification management application, e.g., implemented as Platform as a Service (PaaS) or Software as a Service (SaaS). System embodiments are also related to networked computing systems that include the intermediate computing system and one or more other computing systems that interact with the intermediate computing system through respective networks including a host computing system, one or more user/customer computing systems (which may be in different geographic locations), and one or more third party computing systems (such as a supplier or manufacturer, which may also be in different geographic locations). System embodiments are also related to database configurations and associated data structures and processing involving said data structures, and which can also automatically propagate database changes to respective electronic BOMs thereby resulting in automatic data structure transformations while ensuring that these data structures are current and accurate.

A further embodiment is related to a non-transitory computer-readable medium in the form of an article of manufacture or computer program product comprising instructions, which when executed by a processor of a computing device or implemented using Platform as a Service (PaaS) or Software as a Service (SaaS), causes the computing device to execute computer-implemented process embodiments for specification management and generation of electronic BOMs.

In a single or multiple embodiments, the specification management application generates electronic BOM in a bottom-up matter without the product being initially specified.

In a single or multiple embodiments, the data structure of connected product specifications of the electronic specification family record is in the form of linked objects or tables of a relational database system.

In a single or multiple embodiments, the specification management application receives an electronic document (such as a word processing document, spreadsheet, .pdf document or image) from a computing device of a user and links the electronic document to at least one of the electronic BOM, the electronic specification family record, and a product specification of the electronic specification family record.

In a single or multiple embodiments, an electronic BOM generated by the specification management application may be based on one or multiple specification family records and one or multiple electronic independent product specifications and different combinations thereof. For example, a first electronic BOM for a first product of the product family may be generated by aggregating data of the electronic specification family record and two different electronic independent product specifications so that the first electronic BOM includes respective product attributes defined by respective connected product specifications of the electronic specification family record, at least one product attribute defined by the first electronic independent product specification, and at least one product attribute defined by the second electronic independent product specification. As another example, a second electronic BOM for a second product of the product family is generated by aggregating data of the electronic specification family record, the first electronic independent product specification, and a different, third electronic independent product specification that defines a product attribute that is applicable to the second product but is not part of the electronic specification family record and is different from the product attributes defined by the first and second electronic independent product specifications. Thus, the second electronic BOM includes respective product attributes defined by respective connected product specifications of the electronic specification family record, at least one product attribute defined by the first electronic independent product specification, and at least one product attribute defined by the third electronic independent product specification. As yet another example, the specification management application may read or receive a second electronic specification family record stored in the data store. The second electronic specification family record includes a second data structure of connected product specifications defining product attributes that are applicable to multiple products of the product family, and the electronic BOM is generated by aggregating data of the first and second electronic specification family records and at least one electronic independent product specification.

In a single or multiple embodiments, a product specification of the electronic specification family record is a product specification of multiple electronic specification family records. In other words, multiple electronic specification family records include or include a pointer or reference to the same product specification. Further, a product specification that applies to multiple products and is included in an electronic specification family record may also serve as an electronic independent product specification for a different electronic BOM generated for a different product. Further, an electronic independent product specification that is included in one electronic BOM may be a product specification of a different electronic specification family record for a different product of a different product family or group of products.

In a single or multiple embodiments, the data store includes multiple databases or database files or records (generally, databases) for different types of product specifications. For example, a first database may include product specifications and a second database may include electronic specification family records. An electronic specification family record of the second database may be structured to include pointers to respective flags, indicators or identifiers of respective product specifications stored in the first database. Each account of different users may include a first database of electronic product specifications associated with the account and a second database of generated electronic specification family records for the account. The data store may also be structured to include a third database for electronic independent product specifications.

In a single or multiple embodiments, a specification management application is structured as a networked computing system, e.g., an intermediate or cloud-based computing system implemented in Platform as a Service (PaaS), in which different user computing devices access their respective accounts through respective communication networks and one or more interfaces. Different or respective electronic bills of material are generated by the specification management application, stored in a database or data store associated with respective user accounts, and made available to respective user computing devices through respective communication networks.

In a single or multiple embodiments, the specification management application is an intermediate computing system in communication with and between respective customer and third party computing devices through respective communications networks. The specification management application may provide access to or transmit the electronic BOM that was generated to respective user computing devices and/or third party computing devices (such as a supplier or manufacturer utilized by the customer/user). Third party computing device access or abilities may be restricted, e.g., read-only access to a user account, product specification or electronic BOM.

In a single or multiple embodiments, the specification management application also generates the electronic specification family record and stores the generated the electronic specification family record to the data store. Generation of the electronic specification family record and other processing may occur at different times or in different sequences. For example, the specification management application may receive product specifications from a user computing device (e.g., from a user system or in an electronic mail message), and the received product specifications are stored to the data store. After storing the received product specifications to the data store, product specifications that define common attributes of multiple products of the product family are identified, and the specification family record is generated based at least in part upon these identified product specifications. In one embodiment, product specifications that define common attributes of multiple products are identified before storing the received product specifications to the data store.

In a single or multiple embodiments, the specification management application receives product specifications from a single computing device, whereas in other embodiments, the specification management application is in communication through respective networks with respective computing devices and product specifications are received through different communication networks from different computing devices.

For example, certain product specifications may be received from a New York office of the user, and other product specifications may be received from a San Francisco office of the user. Thus, the product specifications may be received from computing devices at different geographic locations and may be duplicate or non-duplicate specifications since the users at one geographic location may not know what another user at another geographic location has uploaded.

After an initial upload of product specifications to the specification management application, the specification management application may receive additional product specifications from one or more computing devices at one or more locations. Additional product specifications are compared to stored product specifications to determine one or more of whether they are duplicate or non-duplicate of previously stored product specifications, whether they should be stored to the data store or deleted, whether they should replace or update a stored product specification. For example, in the case of an additional product specification being a duplicate of one that is already stored, the duplicate is not stored to the data store and the additional product specification does not replace or update a stored product specification. An alert, such as a real-time message, may be presented through a user interface to notify the user of the duplication product specification. A duplicate may be an exact duplicate or a substantial duplicate (e.g., a specification dimension of a structure being within a certain amount or threshold relative to a dimension of a structure of a stored product specification).

In a single or multiple embodiments, the specification management application receives a product specification that is to update a current product specification. The received updated product specification replaces the stored product specification with the updated product specification (e.g., if the updated product specification is indicated to replace the current stored one or if a difference between the updated and currently stored product specification exceeds a pre-determined threshold such that it is a non-duplicate). This product specification change can then be propagated to automatically update an electronic BOM that incorporates the product specification being updated. The update may involve updating an electronic specification family record or an electronic independent product specification. Thus, embodiments provide for automatic data structure transformations while ensuring that these data structures are current and accurate.

In a single or multiple embodiments, the specification management application identifies duplicate product specifications by comparing stored product specifications, comparing stored product specifications with newly received product specifications or updates thereto or by comparing stored product specifications with product specification data manually entered by a use of the electronic specification processing system. Non-duplicate product specification records are stored to the data store, whereas duplicate product specification records can be deleted, thus resulting in in a more efficient database structure and operation since duplication specification records are not stored and subsequently processed. Non-duplicate product specification records that define common attributes of multiple products of the product family are identified for generation of the electronic specification family record.

Analysis of stored and received product specifications or updates thereto may be performed before or after the received or updated product specifications are stored to the data store. For example, the electronic specification processing system may initially receive product specifications into a buffer or temporary data store, compare buffered product specifications with stored product specifications, identify duplicate product specification in the buffer and delete identified duplicate product specifications from the buffer so that the remaining non-duplicate product specifications are then stored to the data store. Non-duplicate product specifications that define common attributes of multiple products of the product family are identified for generation of the electronic specification family record.

In a single or multiple embodiments, the specification management application presents the electronic BOM through a computer-generated user interface to the user of the specification management application.

BRIEF DESCRIPTION OF THE DRAWINGS

FIGS. 3A-B are block diagrams illustrating how an electronic BOM is generated based on different data structures including a generated specification family record and an independent product specification according to one embodiment;

FIGS. 8A-D depict interactive user interfaces generated according to embodiments, wherein FIG. 8A depicts a user interface generated for a first product specification, FIG. 8B depicts a user interface generated for a second product specification, FIG. 8C depicts a user interface generated for a third product specification, and FIG. 8D depicts an electronic BOM generated according to embodiments and generated based on a linked product specification data structure according to embodiments;

FIGS. 11A-B depict one example implementation of embodiments for managing product specifications and generating electronic bills of material, wherein FIG. 11A depicts how components of embodiments can be integrated into Platform as a Service (PaaS) products for cloud-based specification management applications, and FIG. 11B illustrates an example of connected data structures in the form of connected objects of a relational database system may be configured according to one embodiment;

DETAILED DESCRIPTION OF ILLUSTRATED EMBODIMENTS

Embodiments of the invention provide for a centralized specification management applications and platforms that can be utilized by multiple users or customers (e.g., via a cloud-based computing platform) to generate electronic bills of material (BOMs) for their products. Embodiments improve disparate and inefficient conventional programs that are structured for linear, disconnected, top-down design based on a user initially defining a product and then breaking down the product.

In contrast to conventional linear, "top down" programs, embodiments provide for "bottom up" design using "many-to-many" data structures including connected or linked product specification data structures that apply to multiple products and are used with multiple electronic BOMs while also reducing data storage and processing requirements for product specifications and reducing or eliminating duplicate product specifications, which may be particularly useful in situations involving multiple users at different geographic locations that may not know what each of the other is uploading, while also facilitating updates to product specifications and updates to associated electronic BOMs. In this manner, embodiments are able to promptly execute electronic BOM 160 and other associated data structure updates, and do so automatically, triggered in response to database updates or using periodic electronic BOM refreshes. Thus, when updates are integrated into the system, updates are propagated to other related data structures such that these data structures are transformed to ensure that they are accurate and current.

Various system and method embodiments and aspects thereof are described in further detail with reference to FIGS. 1-12.

Figure 1:
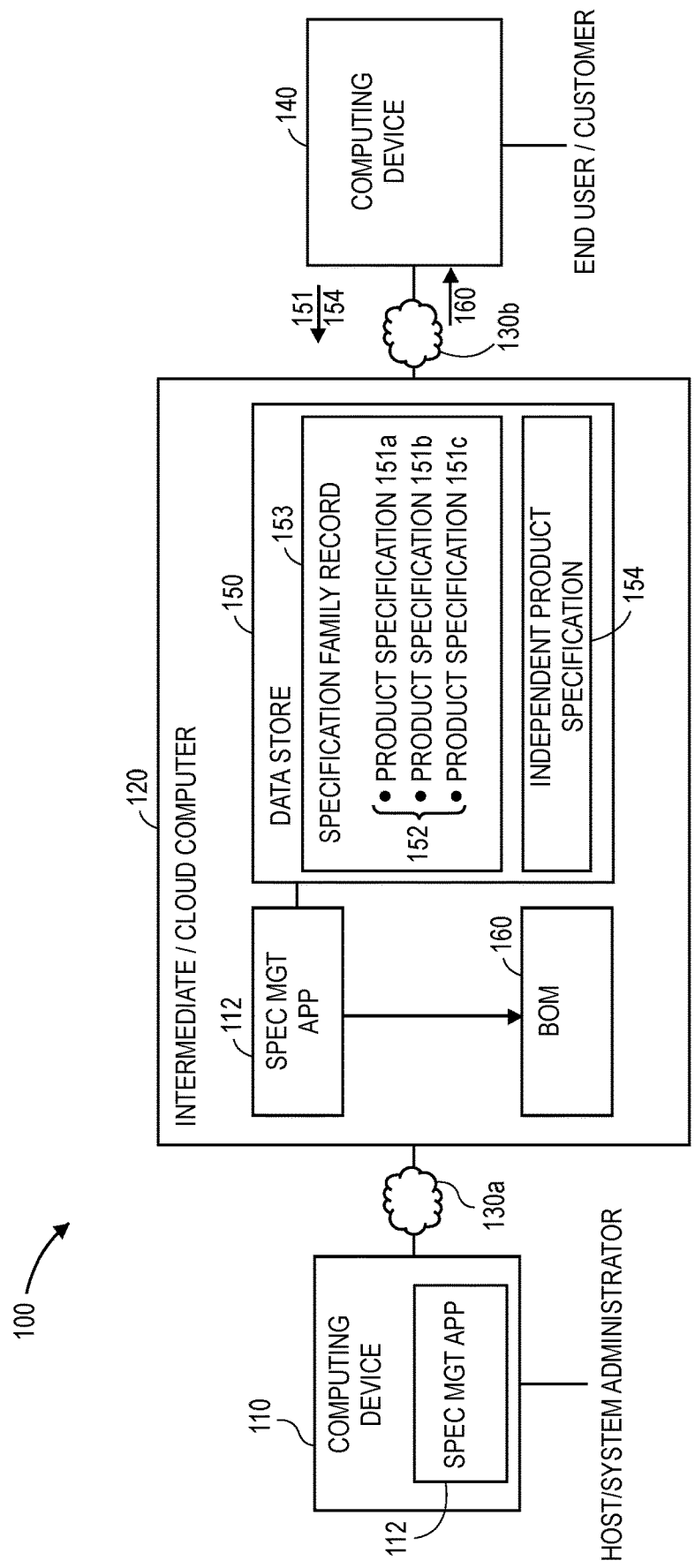
FIG. 1 is a block diagram of one embodiment of a computing system for generating an electronic bill of material (BOM)

Referring to FIG. 1, a specification management system 100 configured according to one embodiment includes a specification management application 112 executing on a computing device 110 of a system manager, host or owner of specification management application 112, which may also be replicated or executable by an intermediate or cloud computer or platform 120, e.g., as part of Platform as a Service (PaaS) or Software as a Service (SaaS) (generally, intermediate computer 120). Host computing device 110 is in communication with intermediate computer 120 via a communication network 130a, and intermediate computer 120 is in communication with an end user or customer computing device 150 via a communication network 130b. Examples of networks 130a-b (generally, network 130) that may be utilized for communications between computing components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 130 generally, but various networks 130, interfaces such as Application Programming Interfaces (APIs) and communication methods may be utilized.

As shown in FIG. 1, specification management application 112 is configured or programmed at host computing device 110, and specification management application 112 may be uploaded by host computing device 110 to intermediate computer 120 and executed by intermediate computer 120 to provide access to various computing devices. In other embodiments, specification management application 112 locally executes on host computing device 110 and access thereto by customer computer(s) 130 can be implemented through intermediate computing device 120 and networks 130a-b, or host computing device 110 may serve as an intermediate computer accessible by various user computing devices 140 such that an intermediate computer 120 platform is not required. For ease of illustration and explanation, reference is made to the system configuration shown in FIG. 1 in which specification management application 112 is uploaded to and executed by intermediate or cloud computer 120.

Specification management application 112 includes computer-executable instructions executable by one or more processors, controllers or data handlers of intermediate computer 120 and is in communication with data store 150 that may, for example, host a relational database system for various product specification, connected data structures and generated data structures as described in further detail below. Data store 150 includes multiple product specifications (151a-c) (generally, product specification 151). Product specifications 151 define or specify particular attributes of a product (e.g., how a certain component is designed, or ingredients of a food product). Examples of product attributes include a product design (including product components, materials, structure or shape, dimensions, labels, and operation) and product packaging design (including packaging materials, structure or shape, dimensions, labels, operation and components), ingredients or composition, etc. Product specifications 151 may, for example, be provided by customer via customer computing device 140 as depicted in FIG. 1 and received by specification management application 112, parsed as necessary (e.g., with an Extensible Markup Language (XML parser) depending on the format of an uploaded product specification), and stored to data store 150. Product specifications 151 may be generated or configured by a user, based on prior or known product specifications or an industry standard or other known or standard configuration. According to embodiments, some or all of product specifications 151 are linked or connected to each other as generally indicated by link or connector 152, and these linked or connected 152 product specifications are used to generate a specification family or specification family record 153.

Data store 150 also includes one or more independent product specifications (154a-b) (generally, independent product specification 154). Independent product specifications 154 may, for example, be provided by customer via customer computing device 140 as depicted in FIG. 1, received by specification management application 112, parsed as necessary, and stored to data store 150. For example, independent product specifications may provide for product customization. Independent product specifications 154 are not linked or connected to each other, not linked or connected to product specifications 151, and not linked or connected to specification family record 153. Instead, they are "stand-alone" or independent, as distinguished from linked or connected product specifications 152.

Figure 2:
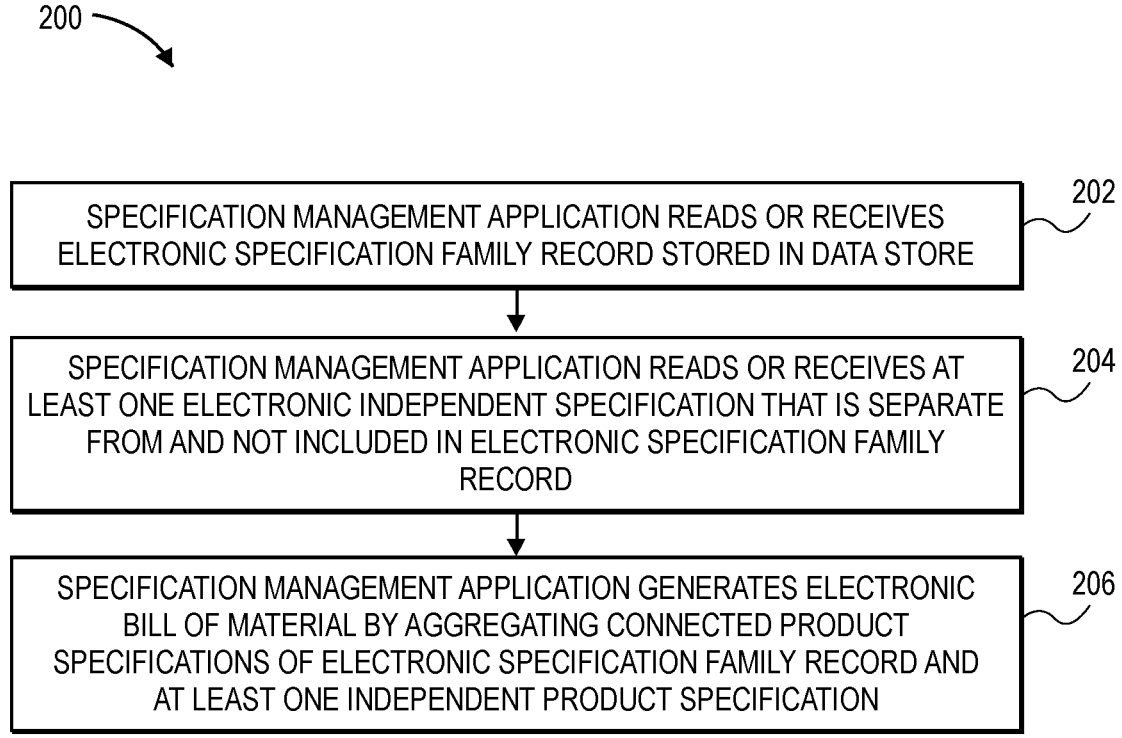
FIG. 2 is a flow diagram of one embodiment of a computer-implemented method for generating an electronic BOM.

Referring to FIG. 2, and with continuing reference to FIG. 1, in a computer-implemented method 200 according to one embodiment, at 202, specification management application 112 reads or receives electronic specification family record 153 stored in data store 150, and at 204, reads or receives at least one electronic independent specification 154. At 206, specification management application 112 generates electronic BOM 160 by aggregating connected product specifications of electronic specification family record 153 or product attributes thereof and at least one independent product specification 154 or product attributes thereof.

Figure 3B:
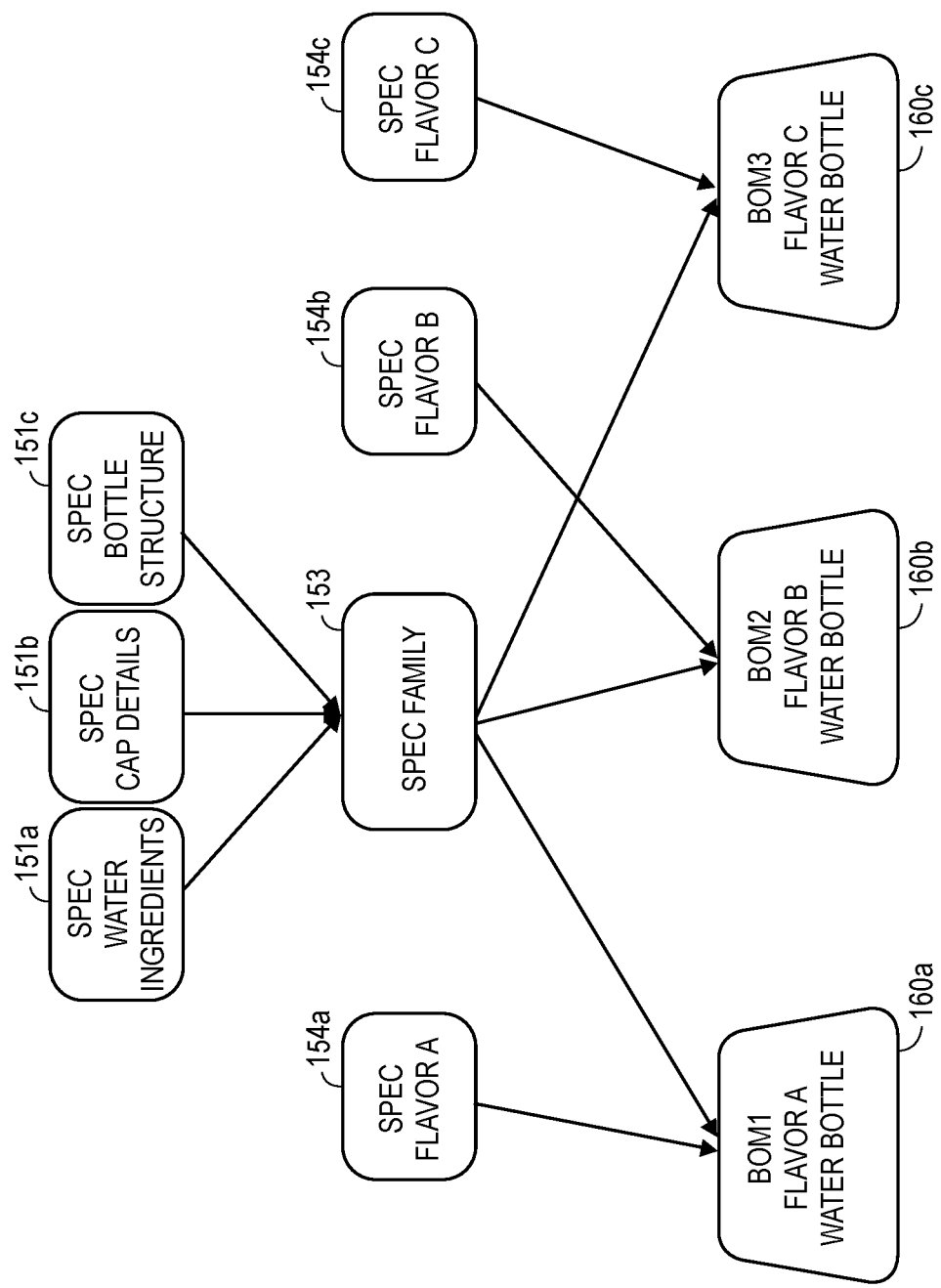

Referring to FIGS. 3A-B, and building upon prior examples involving a bottled water product, examples of how specification management application 112 can execute according to embodiments are illustrated. In the illustrated and example, product specifications 151a, 151b and 151c are connected or linked to each other resulting in specification family record 153. A first independent product specification 154a and specification family record 153 are aggregated by specification management application 112 to generate first BOM 160a, a second independent product specification 154b and specification family record 153 are aggregated by specification management application 112 to generate second BOM 160b, and a third independent product specification 154c and specification family record 153 are aggregated by specification management application 112 to generate third BOM 160c. Thus, connected or linked product specifications 151 (or product attributes thereof) of specification family record 153 are incorporated into all of the BOMs 160a-c, whereas independent product specifications do not apply to all BOMs 160. Thus, specification family record 153 is based on product specifications 151 that define common attributes of multiple products of the product family in contrast to independent product specifications 154.

Referring to FIG. 3B, and continuing the example involving bottled water products and base on the simplified example of FIG. 3A, specification management application 112 may be executed to generate BOMs 160a-c for bottled water products having different flavors. In the illustrated embodiment, specification family record 153 includes product specifications 151a-c that are linked or connected to each other and define common attributes of all bottled water products. The first BOM 1 for Flavor A bottled water is generated based on aggregating product specifications or attributes thereof of specification family record 153 and independent specification 154a specifying Flavor A, the second BOM 1 for Flavor B bottled water is generated based on aggregating product specifications or attributes thereof of specification family record 153 and independent specification 154b specifying Flavor B, and third BOM 3 for Flavor C bottled water is generated based on aggregating product specifications or attributes thereof of specification family record 153 and independent specification 154c specifying Flavor C.

Figure 4:
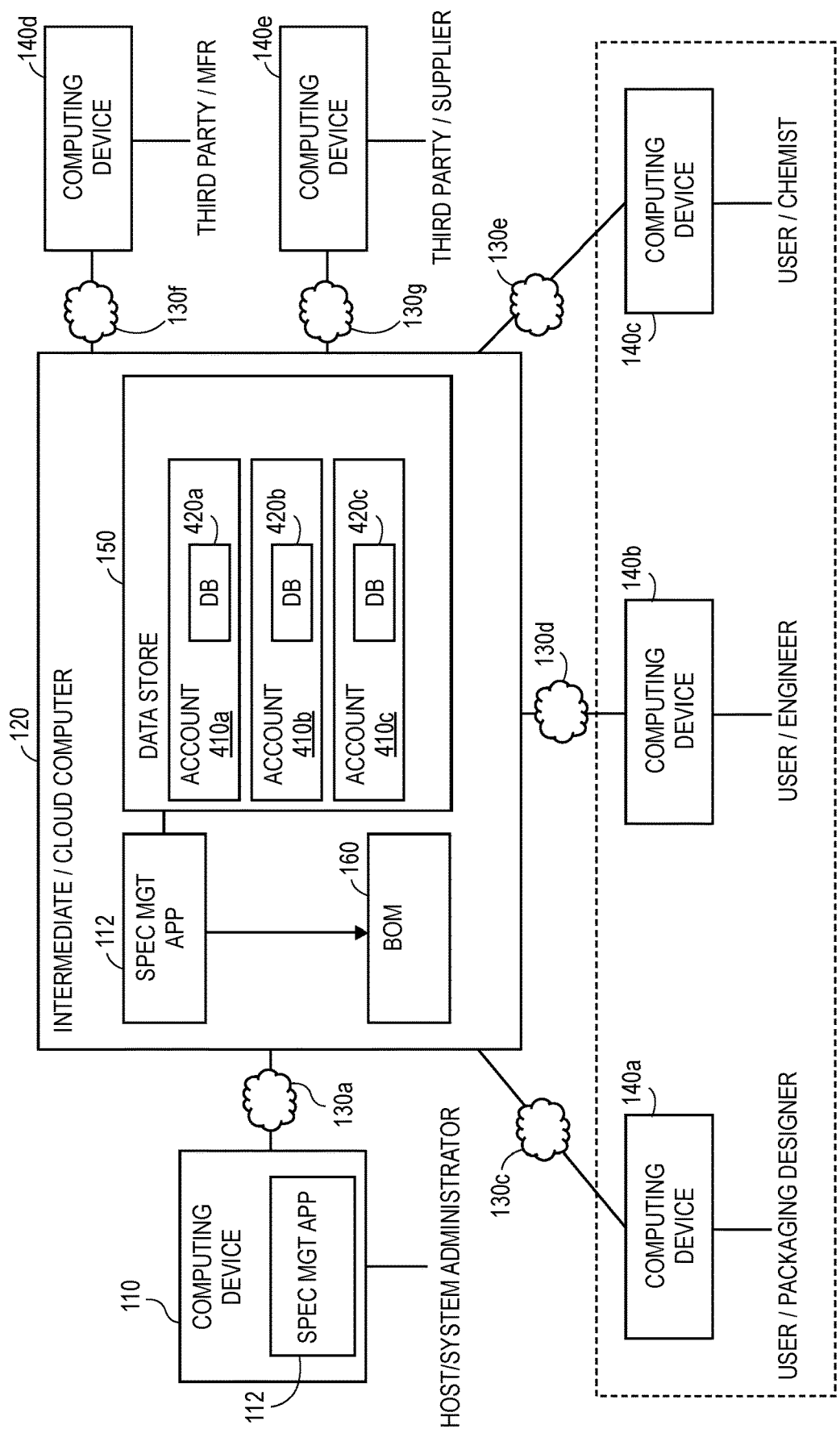
FIG. 4 is a block diagram of one embodiment of a computing system for generating an electronic BOM.

FIG. 4 illustrates a specification management system 400 constructed according to one embodiment including various components discussed above with reference to FIGS. 1-3B and further illustrating how different users access their respective accounts 410a-c with the specification management application 112. FIG. 4 illustrates accounts 410a-c (generally, account 410) that are associated with respective databases 420a-c (generally, database 420) for respective customers or users. Thus, each customer or user has their own account 410 and associated database 420. Specification management application 112 may host hundreds, thousands and millions of accounts 410 for respective users.

User or customer of specification management application 112 may be a company that includes multiple users that are allowed to access an account 410 and access specification management application 112. Thus, one particular user or customer may be a company that has account 410a with specification management application 112, and multiple employees of the company are allowed to access account 410a and utilize specification management application 112. For example, in the illustrated embodiment, user is a company with employees including a packaging designer, an engineer and a chemist. Respective computing devices 140a-c of respective package designer, engineer and chemist are in communication with intermediate computer 120 through one or more communication networks 130c-e. Computing devices 140a-c/employees may be at the same office location or at different offices or different geographic locations and may not know how other users interact with specification management application 112 or what other users are uploading to specification management application 112. For example, a packaging designer in San Francisco may utilize computing device 140a to communicate with intermediate computer 120 through communication network 130c, an engineer in Denver may utilize computing device 140b to communicate with intermediate computer 120 through communication network 130b, and a chemist in Boston may utilize computing device 140c to communicate with intermediate computer 120 through communication network 130e. Thus, while FIG. 4 illustrates an example of three different "employee users" of specification management application 112, users may be employees of the same company (indicated by dashed box around computing devices 140a-c) and granted access to company account 410a. Similarly, a second company or user has a different account 410b, a third company or user has account 410c and so on.

FIG. 4 also illustrates that intermediate computer 120 and specification management application 112 may be in communication with computing devices 140d-e of third parties such as a manufacturer and a supplier involved in the production of the product. Third party computing devices 14-d-e are in communication with intermediate computer 120 through respective communication networks 130f-g. Further aspects of embodiments and operation of same from the initial receipt of product specifications 151, generation of specification family records 153, aggregation of product specifications from specification family record 153 and independent product specifications 154, to generation of an electronic BOM 160 are described in further detail with reference to FIGS. 5-12.

Figure 5:
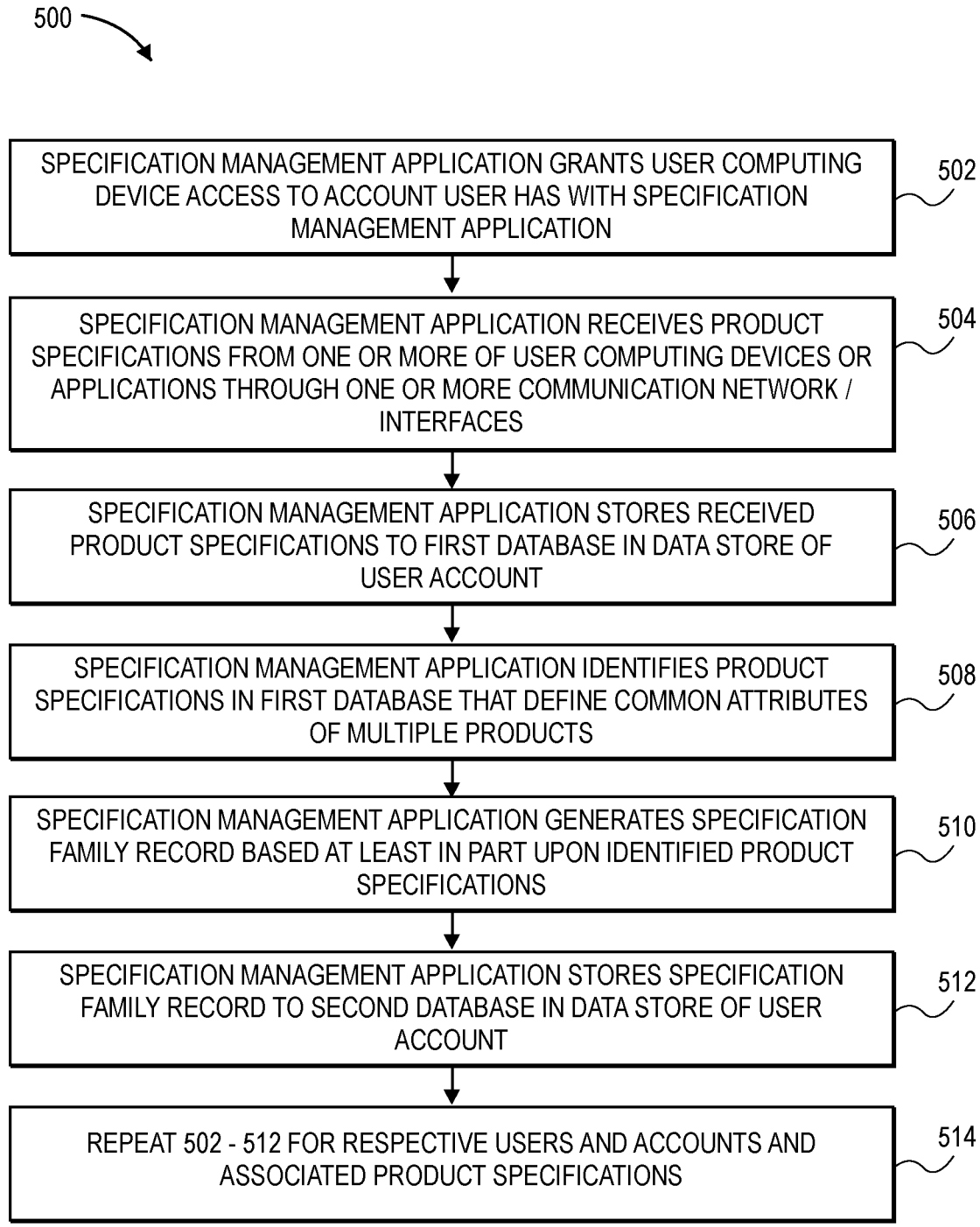
FIG. 5 is a flow diagram of a computer-implemented method for generating data structures and database processing according to one embodiment.

FIG. 5 illustrates processing for receiving product specifications 151 by specification management application 112, e.g., when a user or customer first establishes an account 410 with specification management application 112 and initially uploads their product specifications 151 to specification management application 112. With continuing reference to networked computing system configurations illustrated in FIGS. 1 and 4, in a computer-implemented method 500 according to one embodiment, at 502, user computing device 140 communicates with intermediate computer 120 through communication network 130 to access specification management application 112, which grants user computing device 140 access to the user's account 410 in response to proper credentials.

Figure 6:
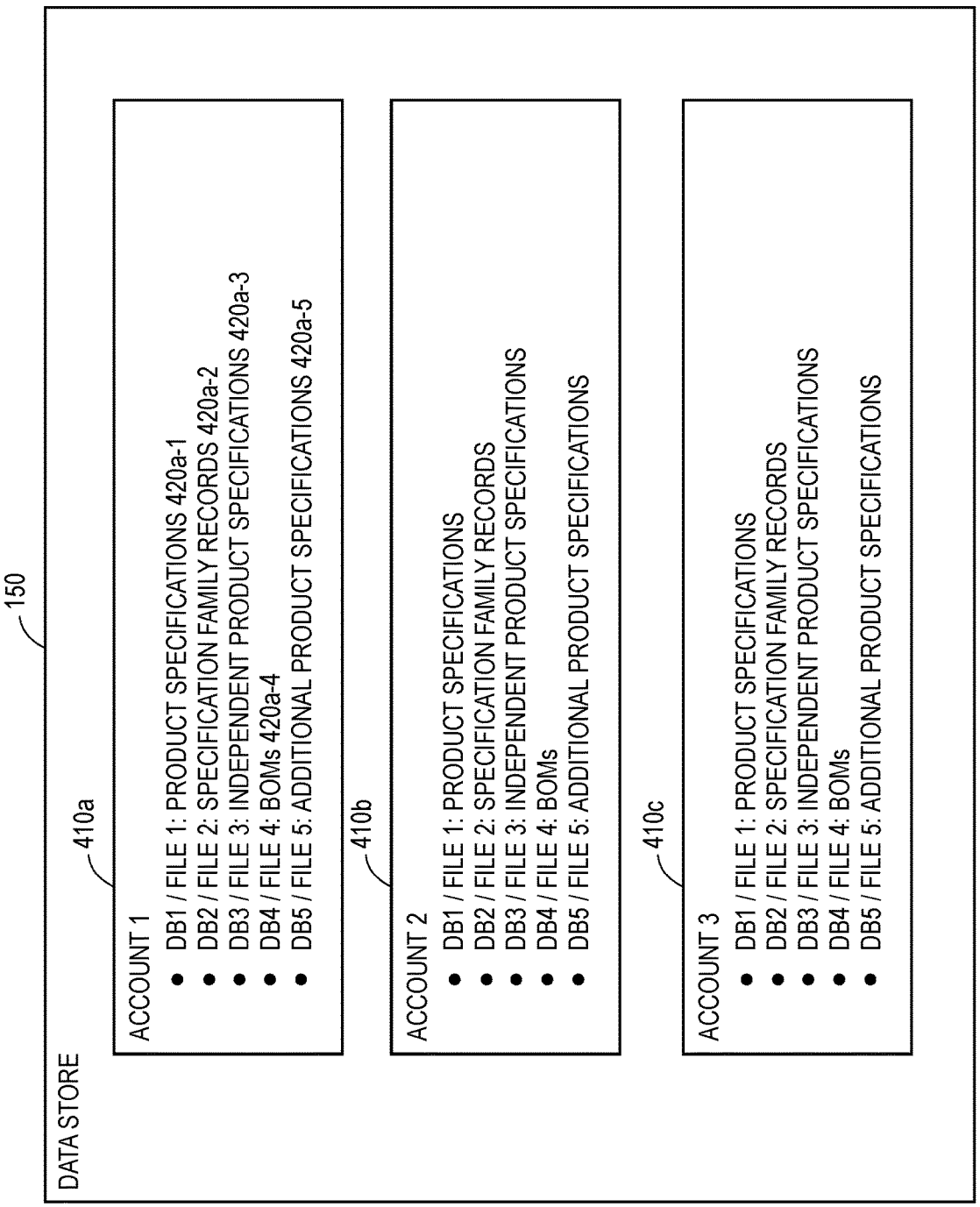
FIG. 6 illustrates in further detail how a database utilized by a specification management application may be structured according to one embodiment.

Referring to FIG. 6, specification management application 112 manages data store 150 including respective accounts 410 for respective users. Each account 410 is associated with a database system 420 that may have multiple different databases, files, records objects or tables (generally, databases) for different types of data received or generated and for different data processing as described in further detail below. In the illustrated embodiment, each account 410 includes multiple databases 420 (DBs), and in the illustrated example, five databases: database DB1 420a (for product specifications 151, or serving as a master directory of product specifications 151 for each account 410), database DB2 420b (for specification family records 153 that are generated), database DB3 420c (for independent specifications 154), database DB4 420d (for generated electronic BOMs 160), and database DB5 420e (serving as a temporary buffer for additional product specifications 151a ("a" referring to "additional" product specifications) that are received after initial product specifications 151 are processed and/or stored to first database DB1 420a). Thus, for Account 1 410a, product specifications 151 are stored in the first database or file 420a-1, generated specification family records 153 are stored in the second database or file 420a-2, independent product specifications 154 are stored in the third database or file 420a-3, generated electronic BOMs are stored in the fourth database or file 420a-4, and additional or subsequently received product specifications are stored in the fifth database or file 420a-5, and similarly for Account 2 410b and Account 3 420c. For ease of explanation, reference is made generally to an account and to an account 410a for reference, and to database 420 and particular databases thereof (e.g., 420a-1, 420a-2, etc.), but it will be understood that this database 240 structure and operation and processing thereof as described in further detail below are provided as non-limiting examples of how embodiments may be implemented and how different types of product specification and electronic BOM data can be processed and generated for generation of different data structures, how data structures may be dynamic and change in view of other changed data structures.

Continuing with reference to FIG. 5, at 504, specification management application 112 receives product specifications 151 from one or more of user computing devices 140 or applications executed thereby through one or more communication networks 130 or application programming interfaces (APIs). At 506, specification processing application 112 parses the received product specifications 151 as necessary in order to determine attributes thereof, and stores received product specifications 151 to database 420a of user's account 410a, and in the illustrated example, to DB1 420a-1, which is for product specifications 151. Thus, first database DB1 420a-1 may serve as a master directory or comprehensive listing of all product specifications 151 that have been received by specification management application 112, and as described in further detail below, embodiments provide safeguards against duplicate entries in first database DB1 420a-1 to provide for more efficient and effective storage, processing and interactions.

At 508, specification management application 112 identifies product specifications 151 in first database DB1 420a-1 to determine which of these product specifications 151 define common attributes that are applicable to multiple products. For example, and continuing the example involving a family of flavored water bottle products as shown in FIG. 3B, product specifications Spec 1 151a for Water Ingredients, Spec 2 151b for Cap Details and Spec 3 151c for Bottle Structure apply to multiple flavored water bottle products, or in other words, these multiple flavored water bottle products includes the same structure or components as recited in these product specifications 151, and this group of product specifications 151 is identified by specification management application at 508.

The user may have also have other water products, such as flavored water products in aluminum cans rather than bottles. Step 508 may involve selecting different group of product specifications 151 that define common attributes applicable to multiple canned products. For example, a group of product specifications 151 may be selected as applying to multiple canned flavored water products of a canned water product family such as Spec 1 (for Water Ingredients), Spec 4 (for can body structure) and Spec 5 (for can top structure). Accordingly, it will be understood that a product family or a group of multiple products may be defined as sharing different types and numbers of attributes, and that one group of product specifications 151 or multiple different groups of product specifications 151 may be identified as defining respective common attributes that are applicable to multiple products. For ease of explanation, reference is made to the example involving flavored water bottle products and identifying a particular or select group of product specifications 151 that define common attributes applicable to multiple flavored bottled water products.

Continuing with reference to FIG. 5, at 510, specification management application 112 generates a specification family record 153 that links or connects 152 the particular or select group of product specifications 151 identified as defining common attributes applicable to multiple products (e.g., product specifications 1, 2 and 3 in the example above). At 512, specification management application 112 stores generated specification family record 153 to database second database DB2 420a-2. As described above, first database DB1 420a-1 serves as a master directory or list of all product specifications 151, and specification family record 153 that is generated is stored in second database DB2 420a-2 and may include copies of the particular or select product specifications 151 that are part of the specification family record 153. In other embodiments, specification family record 153 is generated to include pointers to identifiers or indicators of the particular or select product specifications 151 stored in first database DB1 420a-1 so that it is not necessary to copy and store the select or particular product specifications 151 to second database DB2 420a-2. At 514, processing in steps 502-512 discussed above is repeated for each user/account 410 and product specifications 151 of each account 410.

Figure 7:
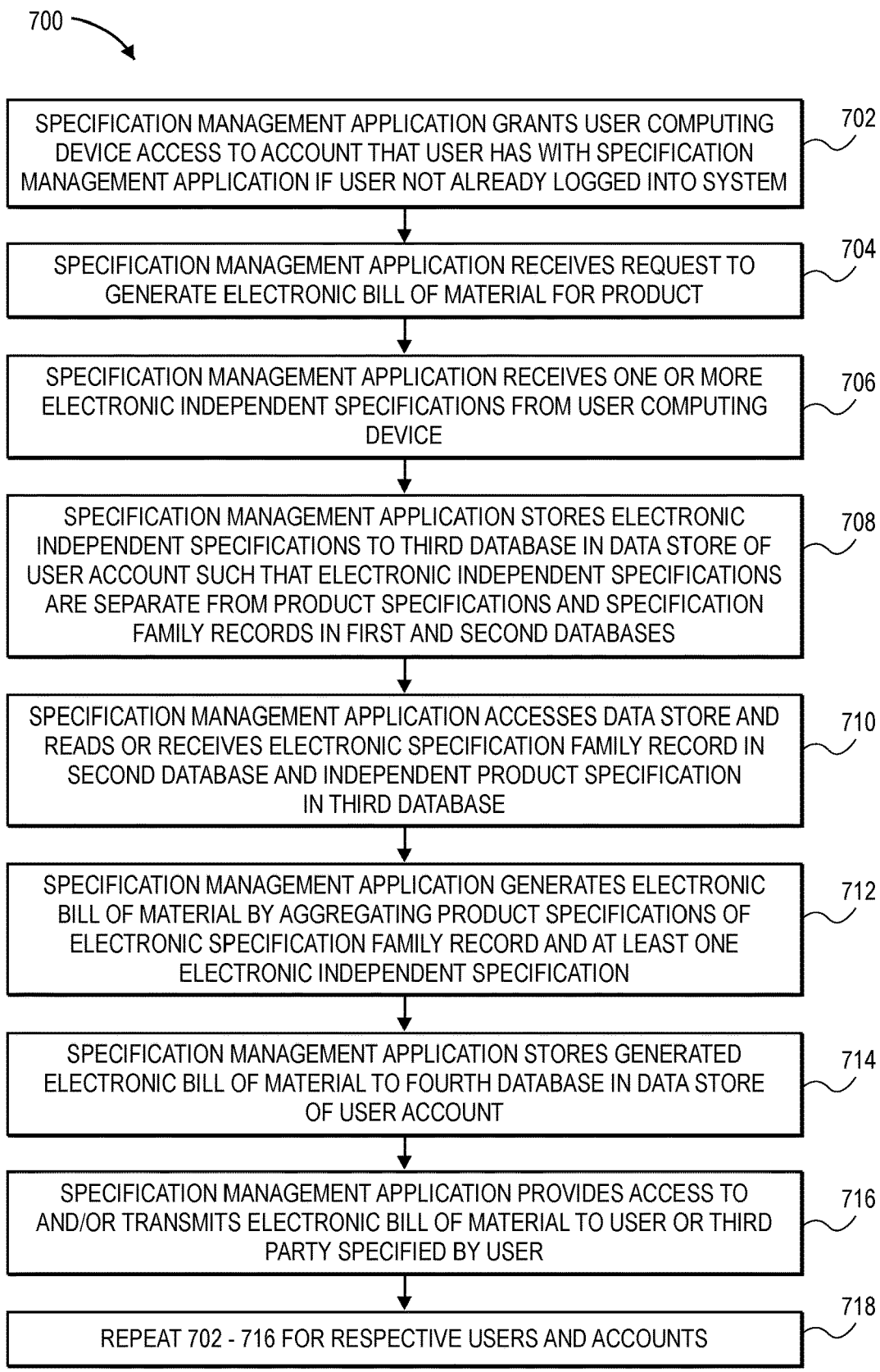
FIG. 7 is a flow diagram of a computer-implemented method for generating an electronic BOM based on a database structure shown in FIG. 6 and connected or linked data structure generation according to one embodiment.

Referring to FIG. 7, having processed the initial or other upload of product specifications 151 into user account 410 and generated one or more specification family records 153 based on a select group thereof, the user, during the same or subsequent session, submits a request to specification management application 112 to generate an electronic BOM 160. Thus, at 702, user computing device 140 accesses intermediate computer 120, and after proper log in credentials, specification management application 112 grants user computing device 140 access to account 410 that user has with specification management application 112 if user not already logged into the system.

At 704, user computing device 140 transmits a request to specification management application 112 to generate an electronic BOM 160. At 706, specification management application 112 requests user to provide any independent product specifications 154. An independent product specification 154 is a product specification that is separate or independent in that it is not connected or linked to any product specification 151 in first database DB1 420a-1 and is not included in or referenced by any specification family record 153 that was previously generated and stored in second database DB2 420a-2. Instead, independent product specification 154 may be separately provided by the user to provide for customization of the product beyond the attributes defined by product specifications 151 of specification family record 153 that apply to other products besides the product currently at issue.

For example, continuing with the illustrative example involving bottled water products, specification family record 153 that was generated includes select product specifications 151 for water ingredients, cap detail and bottle structure that are applicable to multiple water bottle products. In contrast, a particular flavoring to be added is defined by a product specification that is unique to the bottled water product and independent of the product specifications that apply to multiple water bottled water products.

At 706, specification management application 112 receives one or more electronic independent specifications 154, e.g., as provided by user through user computing device 140, and at 708, specification management application 112 parses independent specification 154 as necessary (e.g., with an XML parser) to determine attributes thereof, and stores electronic independent specifications 154 to third database, DB3 420a-3 of data store 150 associated with user account 140a. Thus, independent specifications 154 in third database DB3 420a-3 are separate from, not connected to, and do not refer to any product specifications 151 in first database DB1 420a-1, and separate from and not connected to any specification family record 153 that was generated and stored in second database DB2 420a-2, and not part of connected or linked 152 data structure of specification family record 153. In other words, independent product specifications 154 allow for definition of unique, non-common product attributes.

It will be understood that while the illustrative example involves one independent product specification 154 in the form of a flavoring for a bottled water product, embodiments may involve multiple unique or independent product specifications 154, e.g., flavoring and one or more of vitamin content, sparkling or not, and caffeine content. Further, while flavoring, vitamin content, sparking or not and caffeine content are described as independent product specifications 154 that are not common to multiple products, in other product configurations, a product specification that was an independent product specification 154 in one instance may be included in a generated specification family record 153 in another instance for another product. Similarly, a product specification 151 that is described as being applicable to multiple products (such as cap details) and that used to generate a specification family record 153 in one instance may be an independent product specification 154 in another instance, e.g., if one water product includes a cap whereas another water product includes a pop top or safety ring tab instead. Accordingly, it will be understood that these product configurations and related product specifications are provided as non-limiting examples to explain how embodiments may be implemented.

Continuing with reference to FIG. 7, at 710, specification management application 112 accesses data store 150 and reads or receives electronic specification family record 153 in second database DB2 420b and independent product specifications 154 in third database DB3 420c. At 712, and referring again to FIGS. 1-4, specification management application 112 generates electronic BOM 160 by executing aggregator that combines connected product specifications 151 of electronic specification family record 153 in DB2 420b and at least one electronic independent specification 154 in DB3 420c, and at 714, the resulting electronic BOM 160 may be stored in fourth database DB4 420d in data store 150 for user account 410. At 716, specification management application 112 may then provide access to and/or transmits electronic BOM 160 to user or third party specified by user, as generally illustrated in FIG. 4. At 718, processing of steps 702-716 is repeated for respective users and accounts 410.

FIGS. 8A-D illustrate examples of user interfaces 800 generated by specification management application 112 in which FIGS. 8A-C generally depict a user interface 800a for a Bottle Stricture product specification 151a, (identified as Bottle 123), a user interface 800b for a Label product specification 151b (identified as L100), and a user interface 800c for a Formula product specification 151c (identified as WAH20). User interfaces 800 include respective menu tabs 810a-c for respective product specifications 151a-c. FIG. 8D depicts a user interface 800d for a resulting electronic BOM 160 that is generated for the finished water product (with a menu tab 810d for Finished Goods), which also includes or integrates product specifications "Bottle 123" and "L100" under "Packaging Specifications" and "WAH20" formula under "Formulas," or includes pointers to these product specifications 151 stored in DB1 420a as files, records or objects.

Figure 9:
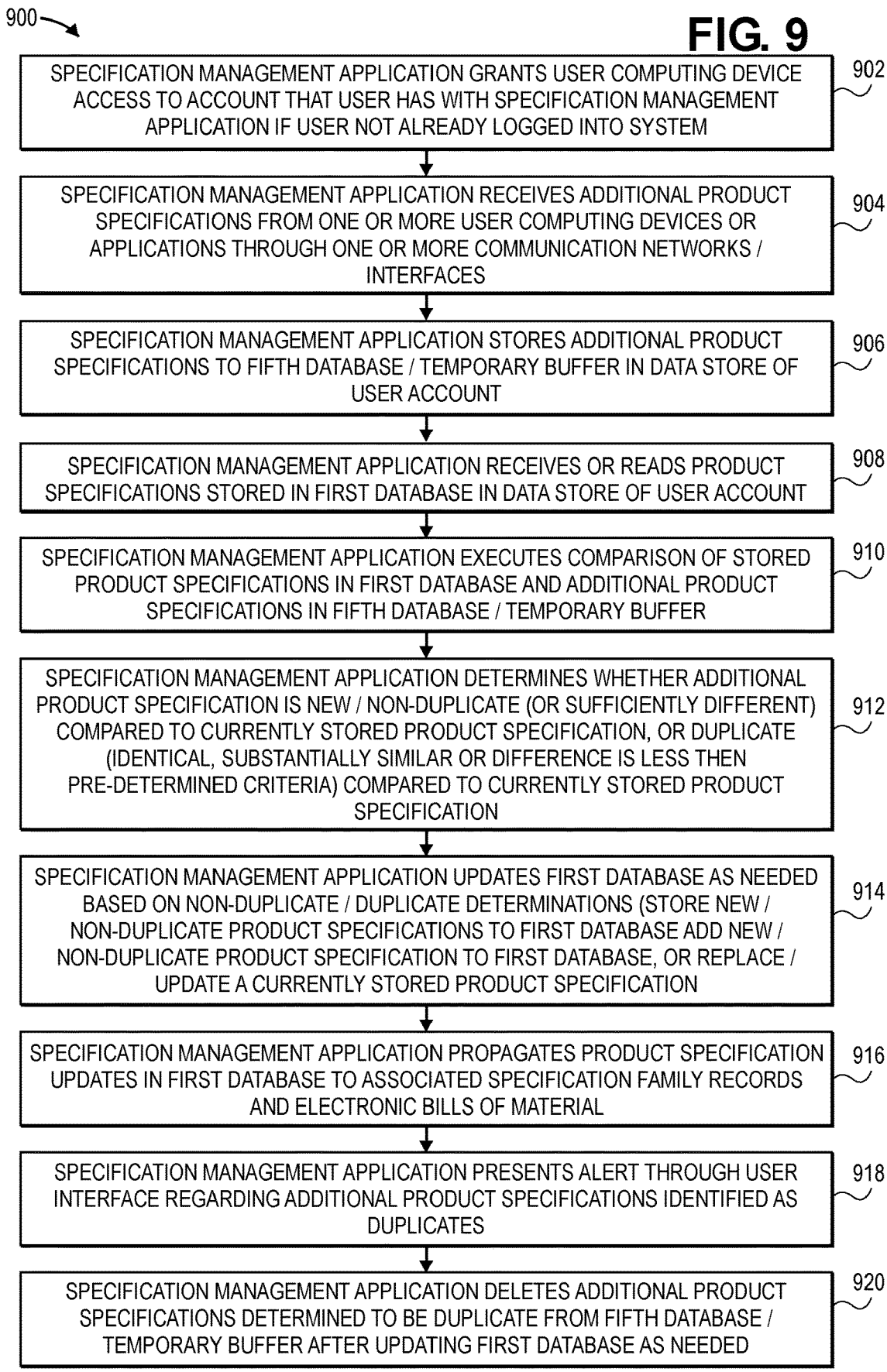
FIG. 9 is a flow diagram of a computer-implemented method for processing additional product specifications updating data structures electronic bills of material according to one embodiment.

Referring to FIG. 9, specification management application 112 also safeguards against storage of duplicate product specifications 151d ("d" referring to "duplicate") to provide for improved data store 150 utilization and operation and more efficient specification management application 112 processing and interactions with data store 150 by not having to interact multiple times with the same file or record. These technical features are particularly beneficial when product specifications 151 are uploaded to specification management system 112 by employees or users who many not know which product specifications 151 have or will be uploaded by others. Embodiments not only provide for more efficient data store 150 utilization by reducing the amount of data that is stored while guarding against duplicate specifications 151d, but embodiments also reduce associated user interactions with product specifications 151 and ensure that a user is interacting with a proper product specification 151 in data store 150. Additional data storage and processing improvements may be realized by specification family records 153 stored in second database DB2 420a-2 being configured to include pointers or indicators to product specifications 151 in first database DB1 420a-1 rather than replicating product specifications 151 in second DB2 420a-2 for specification family records 153. This database structure also facilitates updates to second database DB2 420a-2 since pointers can be added or deleted rather than adding and deleting product specifications 151 themselves.

Referring to FIG. 9, in a computer-implemented method 900 according to one embodiment, after a prior or initial upload of product specifications 151 to first database DB1 420a-1 of data store 150, one or more employees of user or customer may upload additional product specifications 151a to specification management application 112. At 902, specification management application 112 grants user computing device 140 access to account 410 user has with specification management application 112 if user is not already logged into the application, and at 904, specification management application 112 receives additional product specifications 151a from one or more of user computing devices 140 or applications through one or more communication networks 130 or APIs. Additional product specifications 151a may be received from a single computing device 140 or user during a single additional upload, or from multiple computing devices 140 during respective uploads (e.g., computing devices of packaging designer, engineer and chemist as described with reference to FIG. 4). Additional product specifications 151a may also be uploaded to data store 150 during batch processing of product specification uploads.

At 906, these additional product specifications 151a are stored by specification management application 112 to fifth database DB5 420a-5, which serves as a temporary buffer of data store 150 of user account 410. Thus, fifth database DB5 420a-5 may be used for when specification management application 112 determines whether additional product specifications 151a are duplicates 151d of product specifications 151 that are already stored in data store 150 such that these particular additional product specifications 151a and can be deleted, or new, non-duplicate product specifications 151nd ("nd" referring to non-duplicate) that can be added to data store 150.

At 908, specification management application 112 receives or reads product specifications 151 currently stored in first database DB1 420a-1 of user account 410a, and at 910, executes a comparison of product specifications 151 already stored in first database DB1 420a and each additional product specification 420a temporarily stored in fifth database DB5/buffer 420a-5. At 912, specification management application 112 parses additional product specification 151a and stored product specifications 151 as necessary (e.g. with an XML parser) to determine attributes thereof and determines whether additional product specification 151a is a new or non-duplicate product specification compared to currently stored product specification 151 or sufficiently different or different by an amount greater than a pre-determined threshold or criteria, or whether additional product specification 151a is a duplicate of a product specification currently stored in database DB1 420a. A duplicate product specification 151d may be one that is identical, substantially similar, or different by an amount less than a pre-determined threshold, criteria or rule.

For example, additional product specification 151a for a bottle structure temporarily stored in fifth database DB5 420a-5 may be determined to be a duplicate 151d of a currently stored product specification 151 in first database DB1 420a-1 based on certain dimensions of additional product specification 151a varying relative to the stored product specification 151 dimensions by less than a certain amount, e.g., less than 3%, whereas additional product specification 151a may be considered to be new or non-duplicate 151nd based on the additional product specification recites a different shape, different material or dimensions that vary by more than a pre-determined amount as specified by a threshold, criteria or rule. As another example, an additional product specification 151a for water ingredients temporarily stored in fifth database DB5 420a-5 may be determined to be new or a non-duplicate 151nd of a currently stored product specification 151 in first database DB1 420a-1 based on the additional product specification 151a including an additional ingredient or sufficiently different ingredient percentages or ingredient amounts or percentages that vary relative to the stored product specification 151 ingredient amounts or percentages by more than a certain threshold amount.

As another example, an additional product specification 151a for a bottle structure temporarily stored in fifth database DB5 420a-5 may be determined to be a nonduplicate 151nd of a currently stored product specification 151 in first database DB1 420a-1 based on certain dimensions of the additional product specification 151a varying relative to the stored product specification 151 dimensions by more than 10% or other threshold or criteria. As another example, an additional product specification 151a for water ingredients temporarily stored in fifth database DB5 420a-5 may be determined to be a duplicate 151d of a currently stored product specification 151 in database DB1 420a based on the additional product specification 151a including the same ingredients and ingredient percentages relative to the stored product specification 151. It will be understood that determinations regarding whether an additional product specification 151a is a duplicate 151d or a new, non-duplicate 151nd may involve various criteria, thresholds or rules, and that that above examples are provided for purpose of illustration.

Continuing with reference to FIG. 9, at 914, specification management application 112 updates first database DB1 420a-1 as needed based on duplicate 151d/non-duplicate 151nd determinations described above. Additional product specifications 151a determined to be new or non-duplicate 151nd are stored or moved to first database DB1 420a-1 to add these new or non-duplicate product specifications 151nd to first database DB1 420a-1 thus modifying a state or updating the first database DB1 420a-1. According to one embodiment, the additional product specification 151a is added to first database DB1 420a as a new record or file, and in other embodiments, e.g., in which the additional product specification 151a has the same name or other identifier as a stored product specification 151, the additional product specification 151a may replace or update a currently stored product specification 151, and the currently stored product specification 151 or portion thereof can be updated or deleted as necessary. Then at 916, specification management application 112 propagates updates to product specifications 112 in first database DB1 420a-1 to associated generated data structures including any specification family record 153 that is based on an updated product specification and electronic BOMs 160 generated based on a specification family record 153 and any other updated product specification (e.g., an updated independent product specification 154).

With embodiments, electronic BOM 160 updates can be triggered in response to first database DB1 420a-1 being updated, or in another embodiment, based on automated periodic refresh of electronic BOM 160. In this manner, data of an additional product specification 151a that determined to be non-duplicate 151nd can promptly and automatically replace or modify a previously/currently stored product specification 151 can be propagated to a previously generated specification family record 153 and previously generated electronic BOM 160 so that these data structures are transformed to ensure that they are accurate and current, and customers are not using outdated electronic BOMs 160. These automatic data structure updates or transformations are particularly helpful in instances when product specifications are being uploaded by multiple different people at different times at different locations and may not be aware of what each other is uploading or changing and may not be aware of the current status of an electronic BOM in the system.

At 918, for additional product specifications 151 determined to be duplicates 151d of product specifications 151 already stored in first database DB1 420a, specification management application 112 may present an alert through user interface to notify user of duplicate product specification 151d or to request user to confirm whether additional product specification 151a is duplicate 151d or non-duplicate 151nd. At 920, specification management application 112 deletes additional product specifications 151a determined to be duplicate 151d. Thus, it is not required to store these duplicate product specifications 151d to master product specification directory or list in first database DB1 420a-1 and instead, the duplicate product specification 151d can be deleted from temporary buffer of fifth database DB5 420a-5. Thus, embodiments safeguard against duplicate product specifications 151d being added to user's account 410, provide for efficient data store and database structure updates and updates to data generated structures while eliminating user interactions with duplicate product specifications.

Figure 10A:
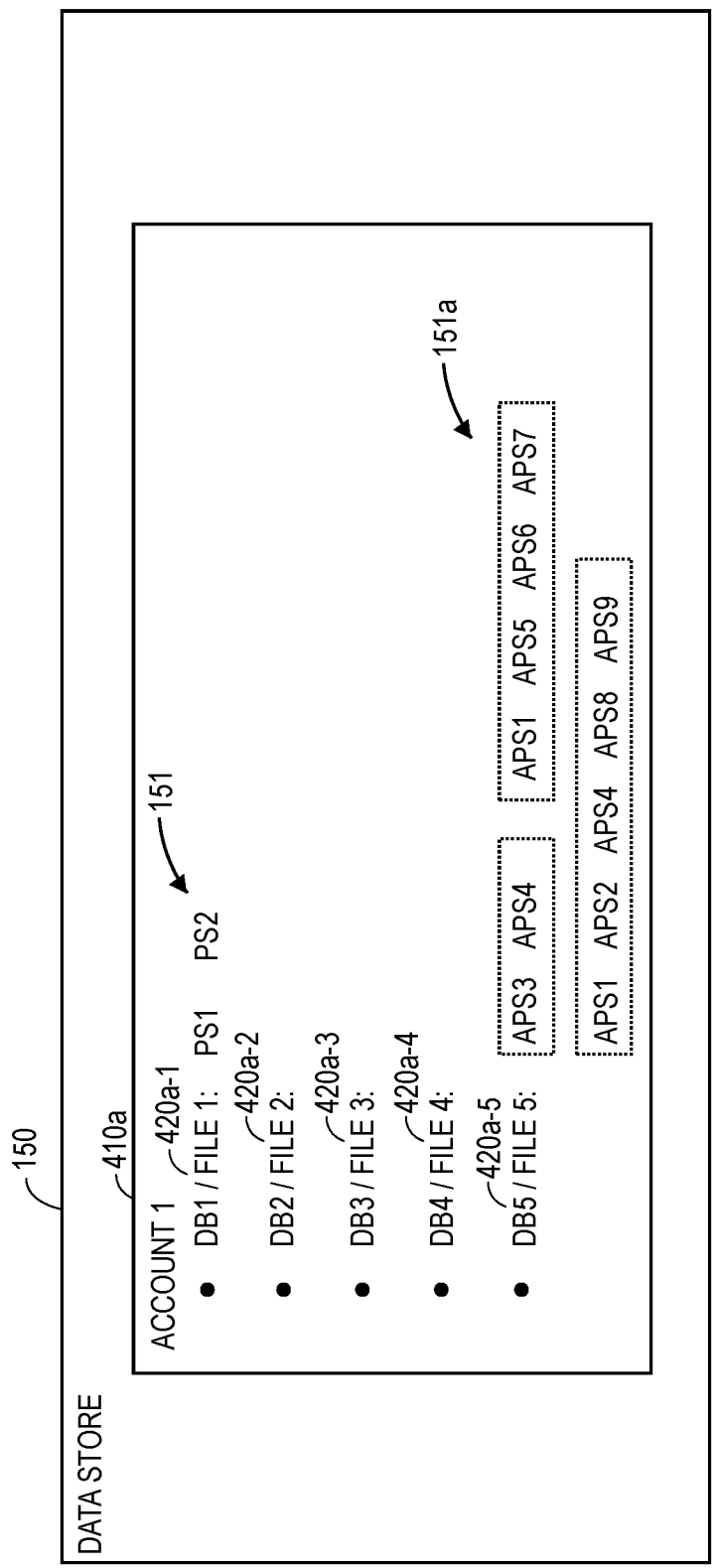
FIGS. 10A-C illustrate how database updates are executed for processing additional product specifications according to one embodiment.

To generally illustrate example of how embodiments may be implemented, referring to FIG. 10A, first database DB1 420a-1 of user's account 410a may include product specifications 151 (PS1 and PS2) that were initially uploaded to first DB1 420a-1. A first employee may upload additional product specifications 151a including additional product specifications 3 and 4 (APS3 and APS4), a second employee may upload additional product specifications 151a including product specifications 1, 5, 6 and 7 (APS1, APS5, APS6 and APS7), and a third employee may upload additional product specifications 151a including product specifications 1, 2, 4, 8 and 9 (APS1, APS2, APS 4, APS8 and APS9).

Figure 10B:
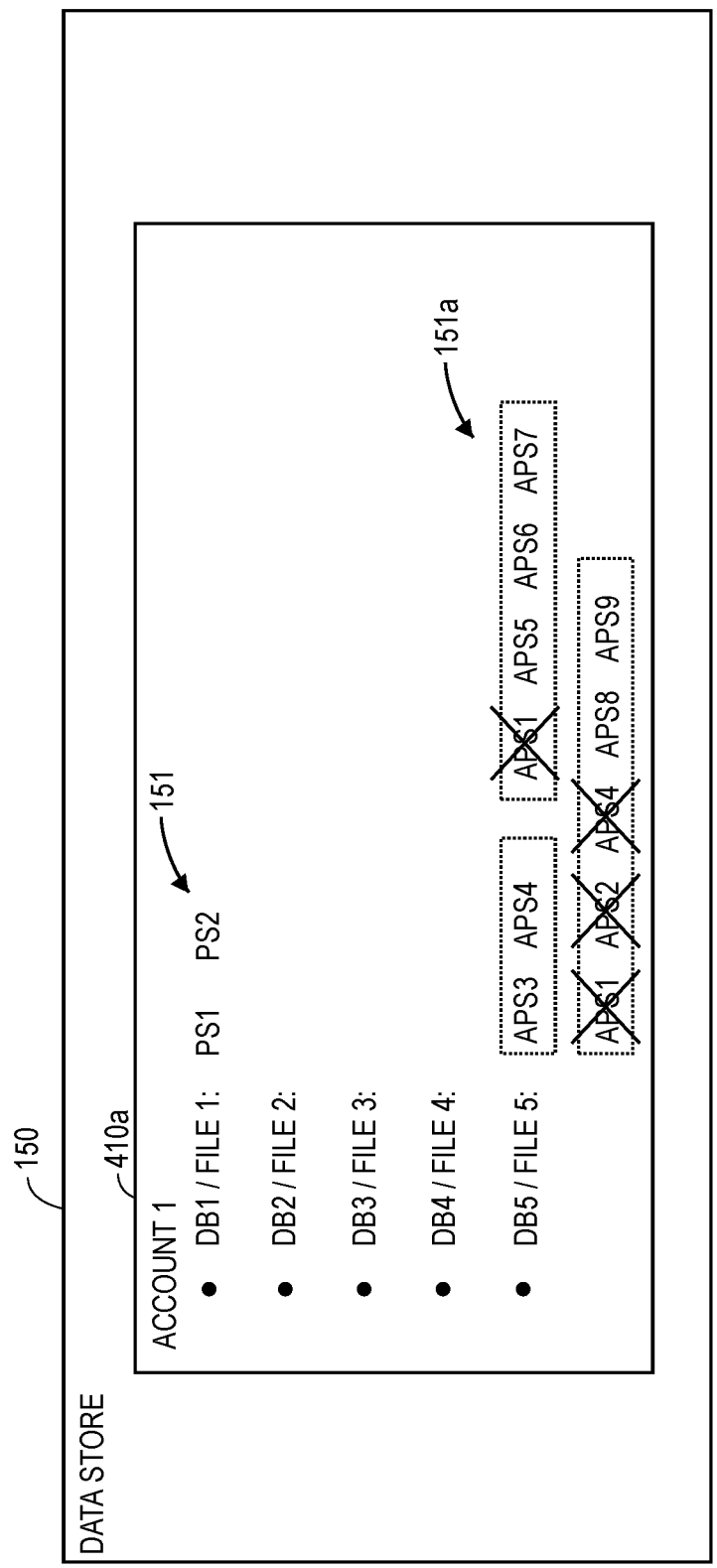
Figure 10C:
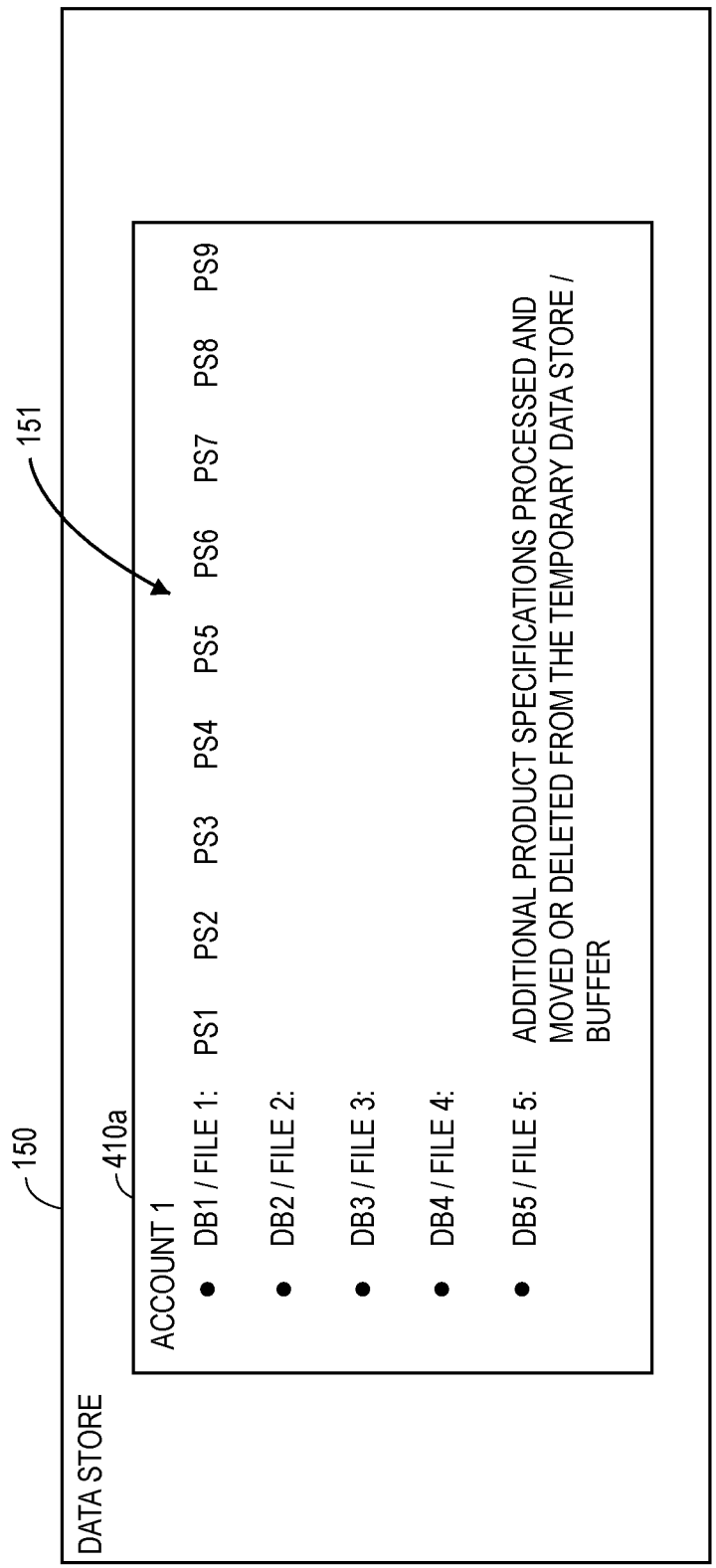

Referring to FIG. 10B, additional product specifications APS3 and APS4 uploaded by the first employee are determined to be new or non-duplicate 151nd and are thus moved or copied to first database DB1 420a (not crossed out in FIG. 10B), and then these specifications can be deleted from buffer or fifth database DB5 420A-5. Additional product specifications APS5, APS6 and APS7 uploaded by the second employee are determined to be new or non-duplicate 151nd and also moved or copied to first database DB1 420a-1, and then they can be deleted from the buffer or fifth database DB5 420a-5, whereas additional product specification APS1 uploaded by the second employee is determined to be duplicate 151d and deleted from the buffer or fifth database DB5 420a-5. Additional product specifications APS8 and APS9 uploaded by the third employee are determined to be new or non-duplicate 151nd and moved or copied to first database DB1 420a, and then deleted from the buffer or fifth database DB5 420a-5, whereas additional product specifications APS1, APS2 and APS4 uploaded by the third employee are determined to be duplicate 151d and deleted from the buffer or fifth database DB5 420a-5.

Updated or modified product specifications in first database DB1 420a-1 can then be propagated to other data structures, which may be done automatically. For example, first database DB1 420a-1 updates can be automatically propagated to respective specification family records 153 and electronic BOMs 160. Thus, embodiments not only guard against storing duplicate product specifications 151d, provide for reduced data storage requirements and more efficient use of data storage while reducing user interactions with specifications that are duplicates, but embodiments also provide for automated updates to other data structures after processing of additional product specifications 151a as described above including generated data structures of a specification family record 153 and an electronic BOM.

Further, while duplicate/non-duplicate determinations are described with reference to product specifications 151 and first database DB1 420a-1, similar processing may also be applied to third database DB3 420c-3 for independent product specifications 154 to determine whether an additional independent product specification is duplicate or non-duplicate relative to an independent product specification 154 that is already stored in third database DB3 420c-1, and such updates can also be propagated to respective electronic BOMs 160, but not to specification family records 153 sine an independent product specification 154 is not included in and is separate of a specification family records and associated connected or linked product specifications 151. Thus, specification management application 112 may execute automatic updates to an electronic BOM 160, or to multiple generated structures including a specification family record 153 and an electronic BOM 160, based on first database DB1 151a-1 updates.

Figure 11A:
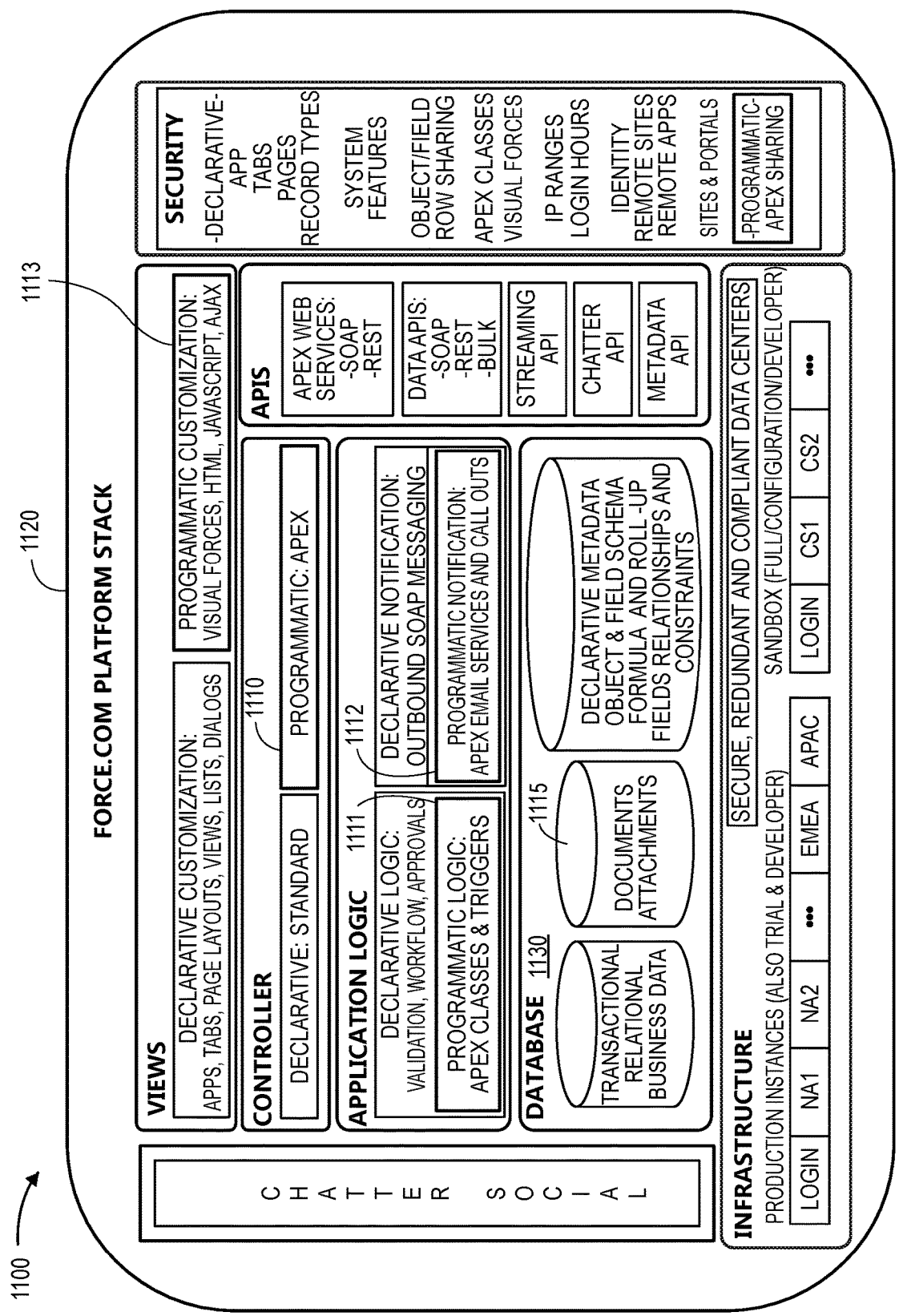
Figure 11B:
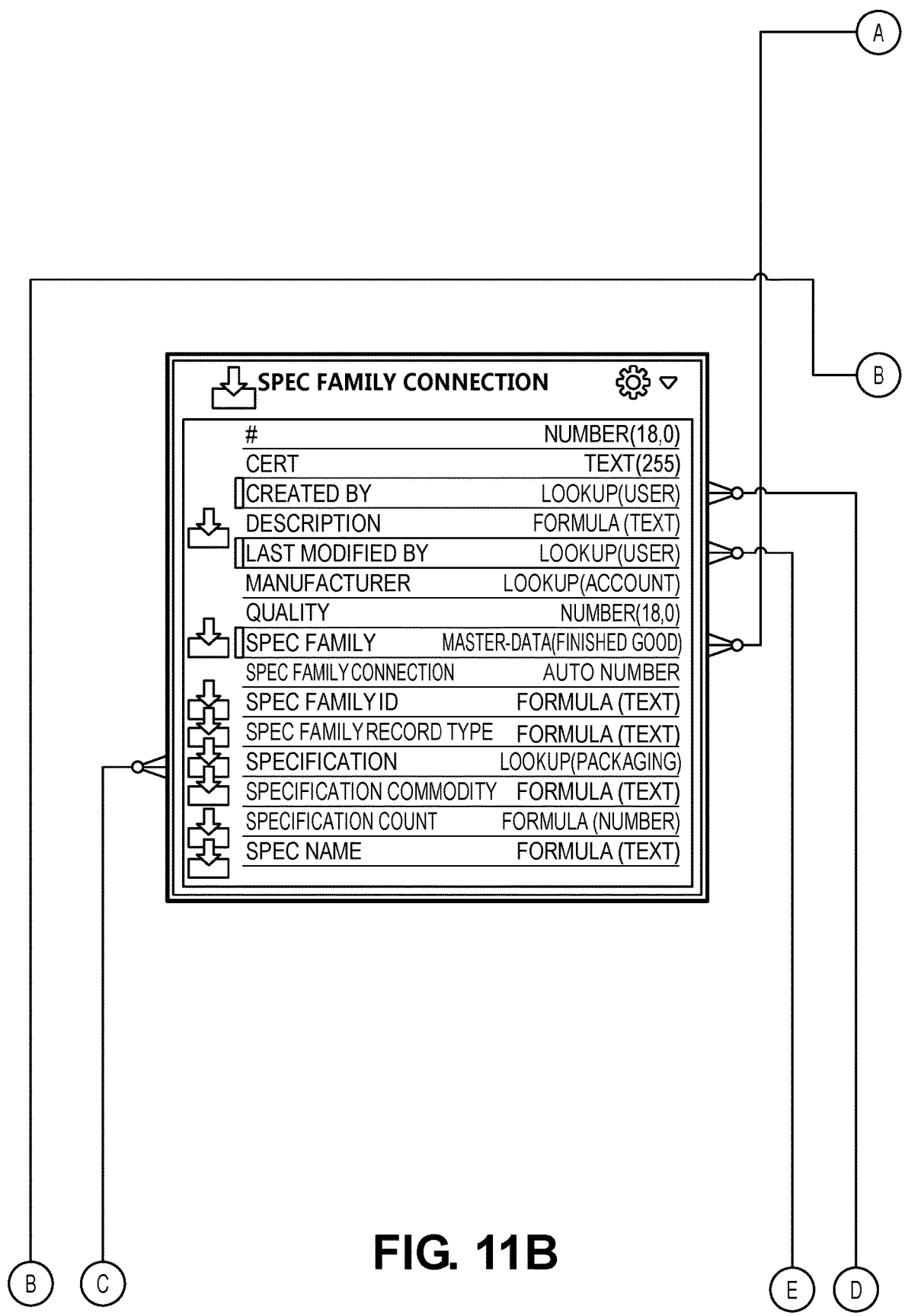
Figure 11B:
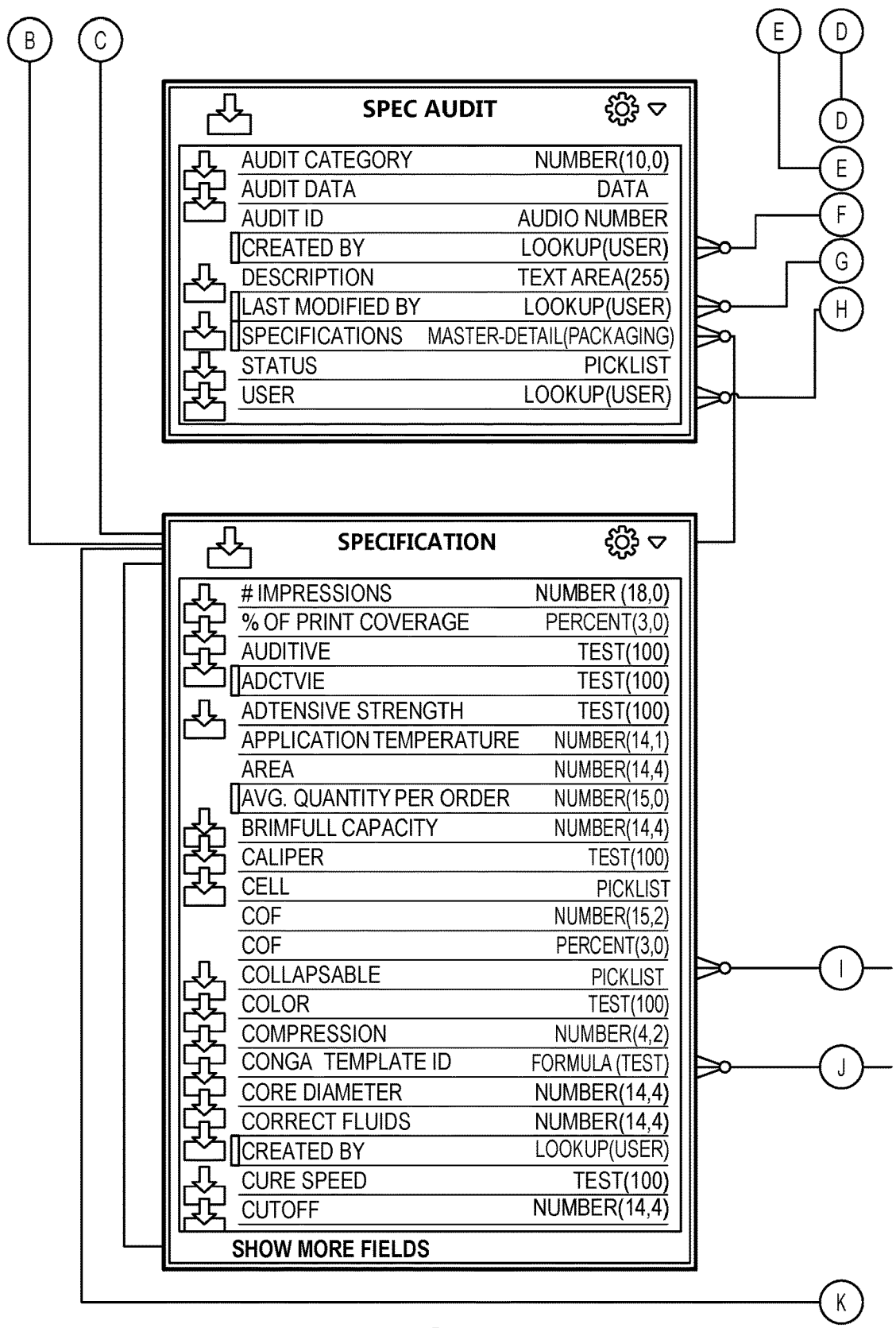
Figure 11B:
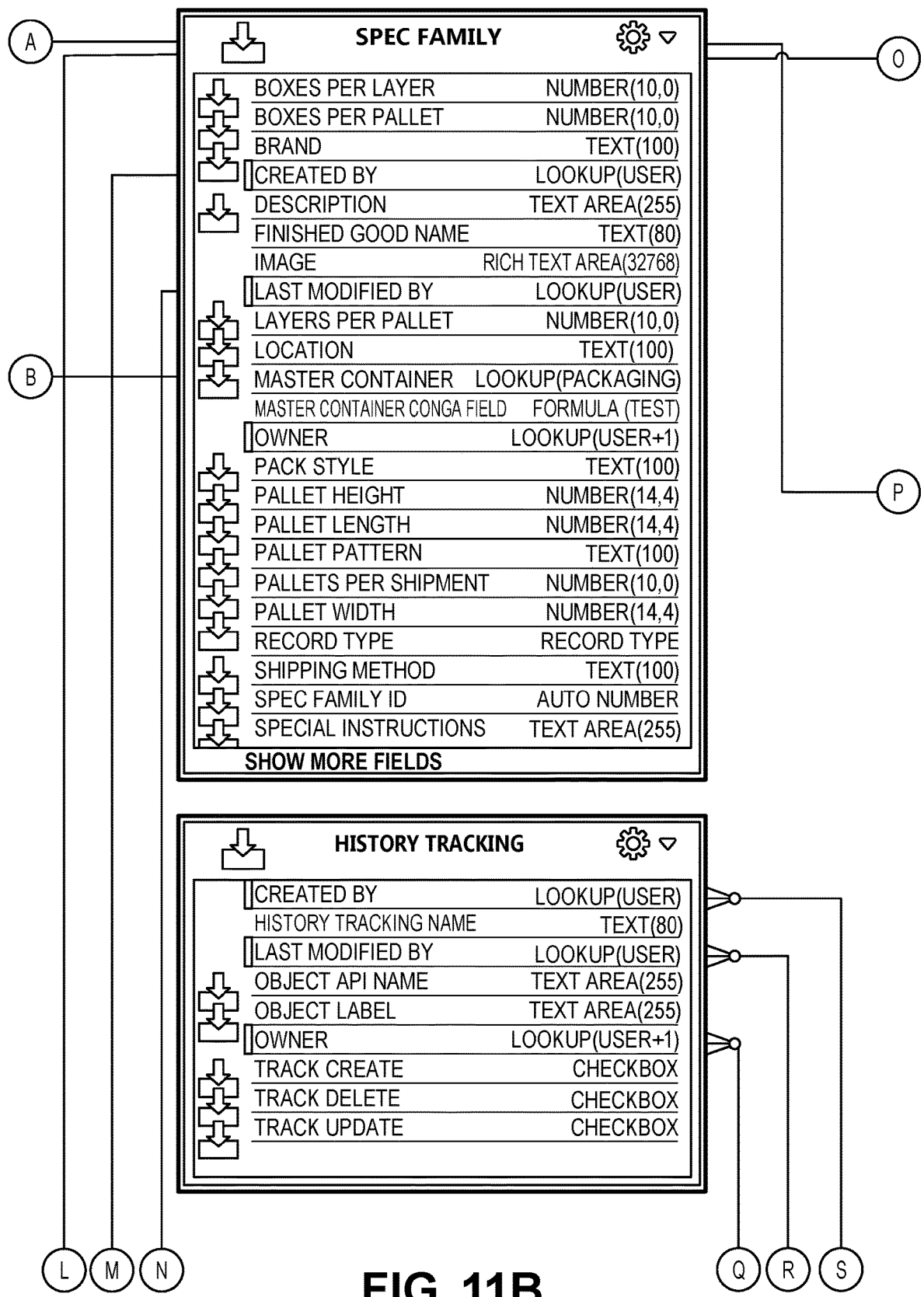
Figure 11B:
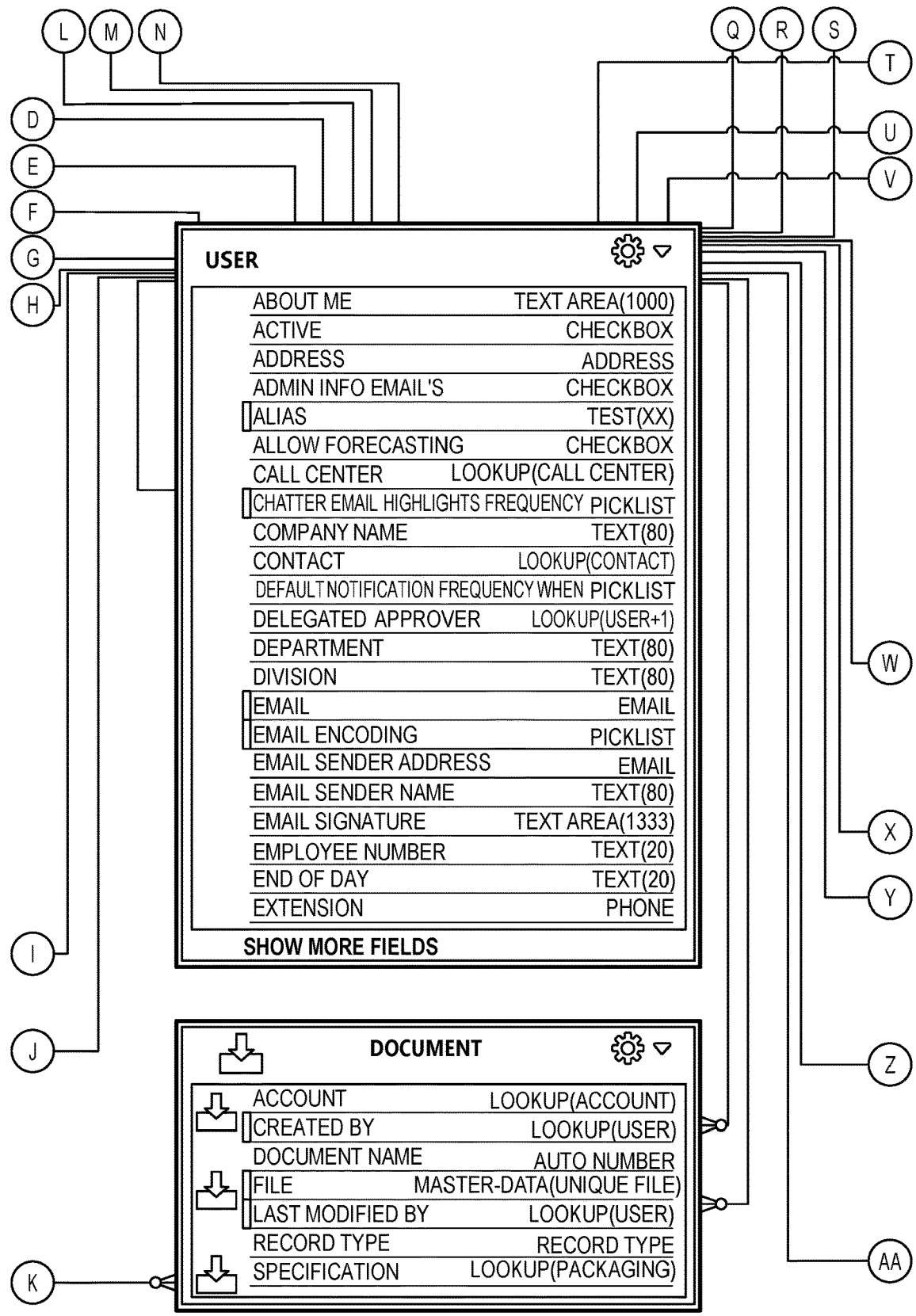
Figure 11B:
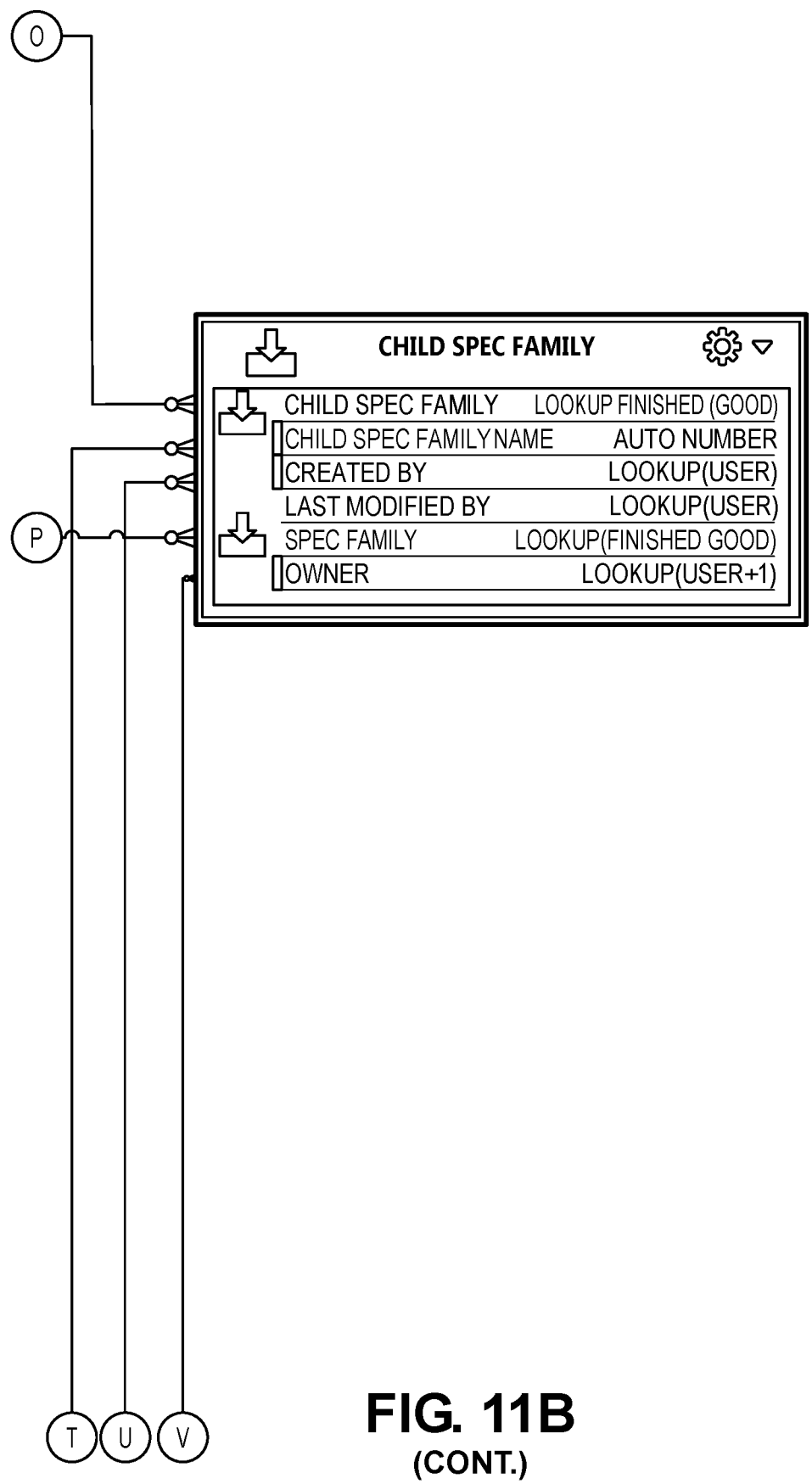
Figure 11B:
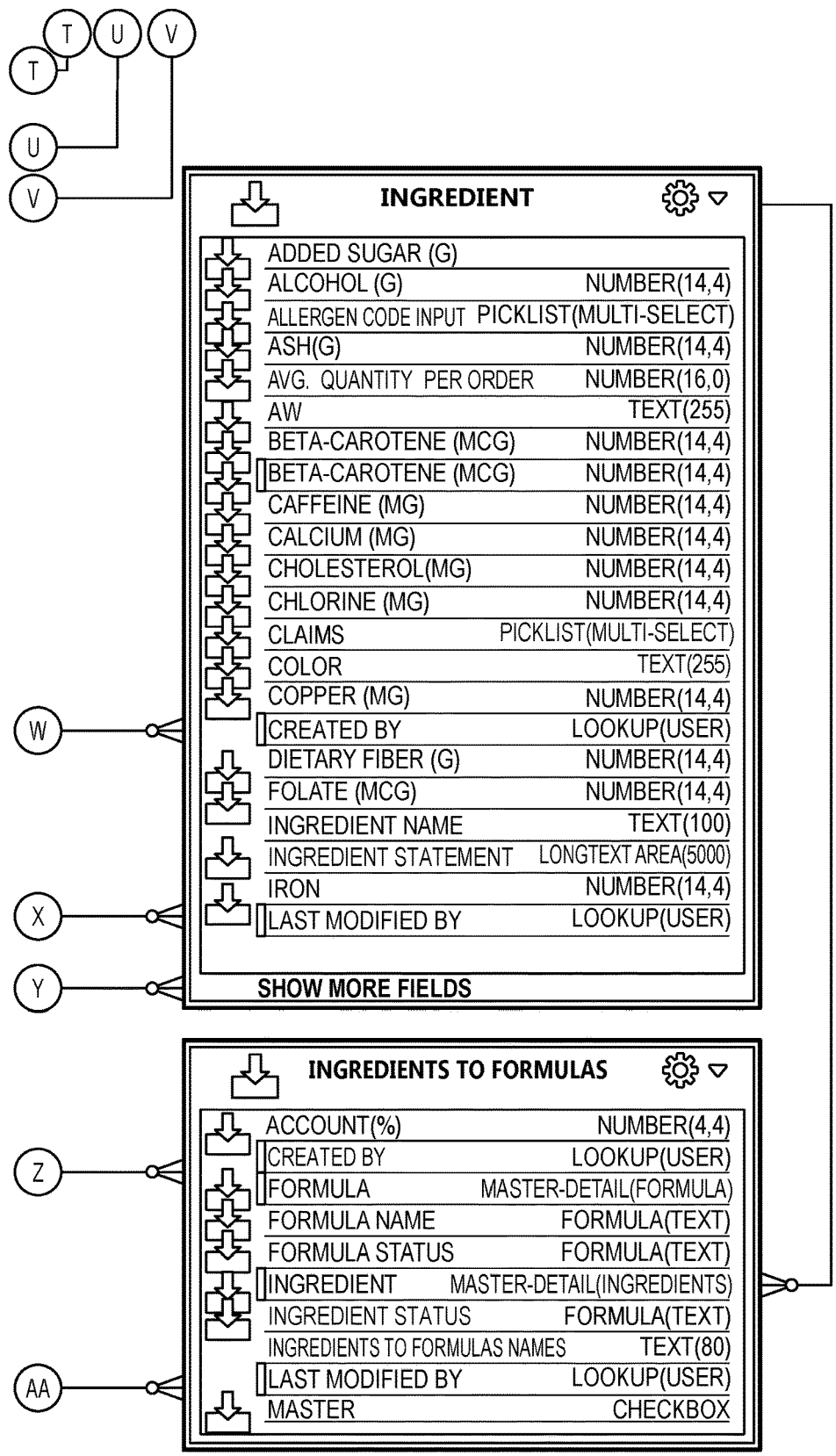

FIGS. 11A-B illustrate an example of how embodiments may be implemented in which specification management application 112 is uploaded to and executed by a cloud computing platform, e.g., using Platform as a Service (PaaS) available from Salesforce. FIG. 11A illustrates an example system configuration for implementing embodiments, and FIG. 11B illustrates part of a linked or connected 152 data structure or linked objects of a relational database structured according to embodiments.

With the system configuration 1100 shown in FIG. 11A, and based on the configuration and operation previously described above with reference to FIGS. 1 and 4, specification management application 112 embodied in highlighted components (Controller—Programmatic: APEX) 1110, Application Logic 1111, 1112 (Programmatic Logic and Notification), and Views (Programmatic Customization) 1113 are integrated into a cloud computing platform 1120 with data store 150 or relational database that hosts accounts 410. Database 1130 includes database records including specifications (e.g., first database DB1 for product specifications, second database DB2 for specification family records, third database DB3 for independent product specifications, fourth database DB4 for finished goods or electronic BOMs, and fifth database DB5 for additional product specifications). As shown in FIG. 11A, and also FIGS. 1 and 4, specification management application 112 and database 420 are configured and controlled by host and uploaded or replicated to cloud or intermediate computing device 120, and specification management application 112 is accessible to customers or users via a communication network 130/ Application Programming Interfaces (APIs) 1140 through which customer data can be uploaded to specification management application 112, and specification management application 112 data is communicated to user computing device 140.

FIG. 11B illustrates an example of how relational database system and connected or linked objects or records thereof may be structured to implement embodiments and utilize to process product specifications 151 and generate electronic BOMs 160. Users are presented with generated electronic BOMs 160 (e.g., as shown in FIG. 8D), which may also include product specifications or links thereto (as shown in FIGS. 8A-C), but users are not exposed to underlying linked or connected 152 data structures such as in the example shown in FIG. 11B.

In the illustrated embodiment of FIG. 11B, a "Spec Family" object, table or file 1150 or specification family record 153 for a particular user 1151, as described in embodiments above, is a data structure of connected product specifications defining product attributes that are applicable to multiple products and aggregated together. For this purpose, "Spec Family" 1150 includes pointers, indicators, references or connections to product specifications (e.g., object, table or file "Specification" 1152 is illustrated) resulting in a connected or linked data structure 152 of various product specifications 151. The "Spec Family Connection" 1154 object, table or file specifies the connections or links for a Spec Family 1150 or specification family record. A given product specification ("Specification") 1152 may be part of one or multiple specification family records. Further, a specification family record may include one or more child families ("Child Spec Family") 1156. Continuing prior examples, a child family may be for a plastic water bottle, and another child family may be for a metal bottle relative to a larger family of bottled water products. The data structure shown in FIG. 11B also provides for linking or connecting an electronic document 1157 to be attached or associated with certain database objects, also provided in FIG. 11A as "Documents Attachments" 1115. For example, a word processing document, a .pdf document, an electronic image or a spreadsheet file may be specified by "Document" and as shown in FIG. 11B, is linked to one or more other database objects. For example, specification management application 112 may receive an electronic document from a computing device 140 of a user and links the electronic document to at least one of the electronic BOM 160, electronic specification family record 153, product specification 151 or independent product specification 154. It will be understood that FIGS. 11A-B are provided as illustrative, non-limiting examples of system configurations and data structures and data structure connectivity in a relational database.

Figure 12:
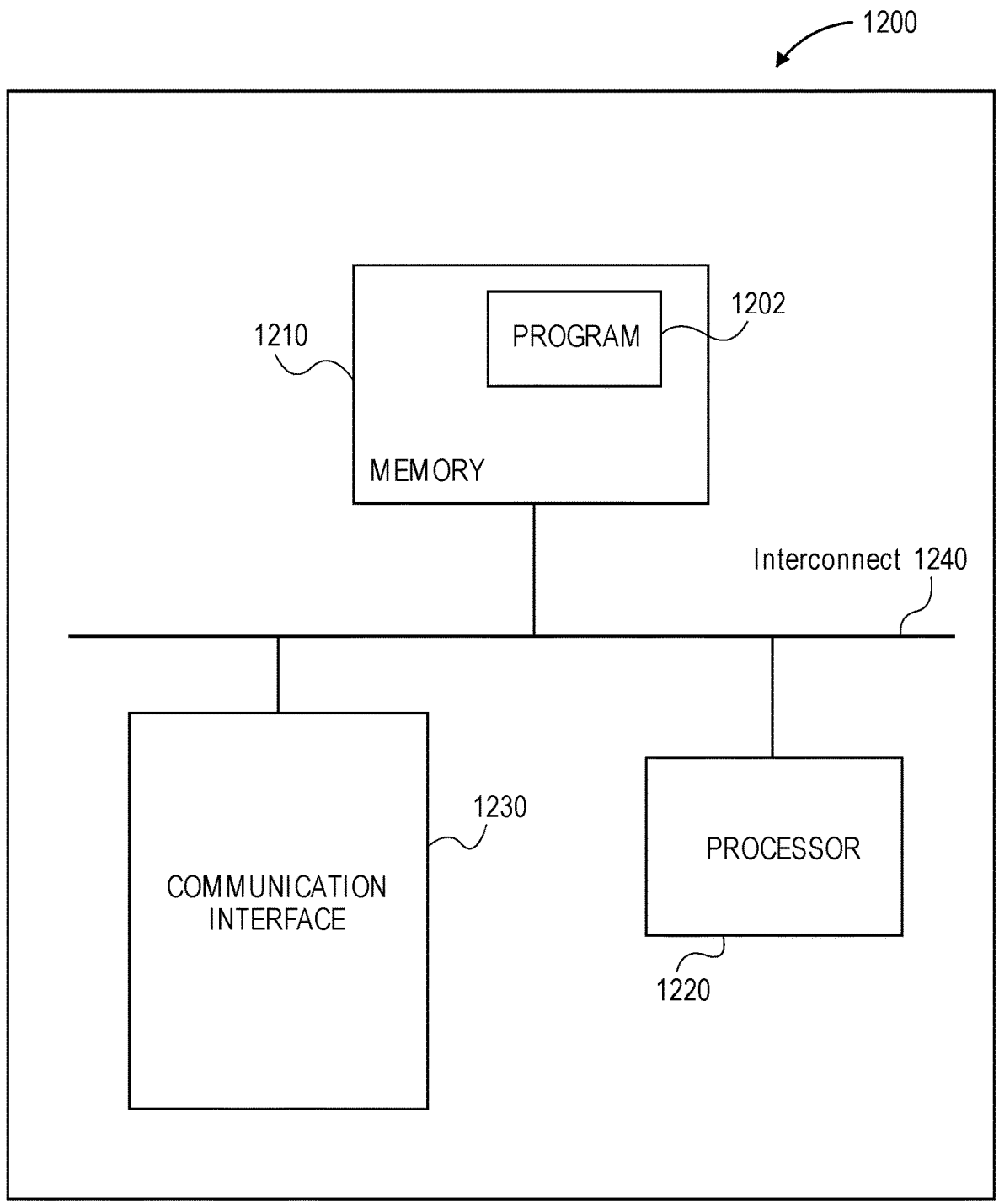
FIG. 12 is a system diagram of components of computing apparatus that may be utilized by various system components.
Figure 13A:
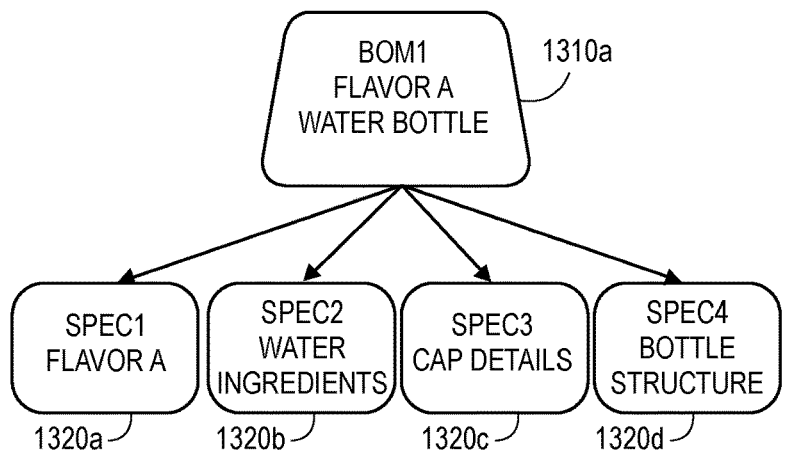
FIGS. 13A-C depict an example of how prior art systems are configured in a linear, disconnected, top-down configuration.
Figure 13B:
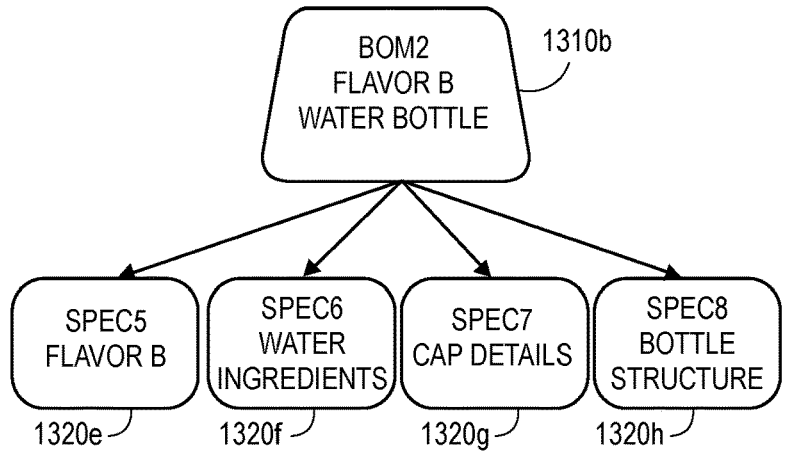
Figure 13C:
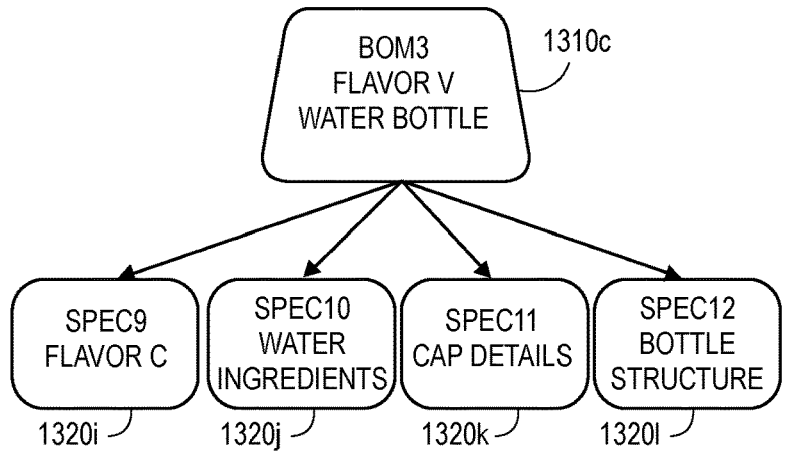

FIG. 12 generally illustrates components of a computing device 1200 that may be utilized to execute embodiments and that includes a memory 1210, program instructions 1212, a processor or controller 1220 to execute program instructions 1212, a network or communications interface 1230, e.g., for communications with a network or interconnect 1240 between such components. The memory 1210 may be or include one or more of cache, RAM, ROM, SRAM, DRAM, RDRAM, EEPROM and other types of volatile or non-volatile memory capable of storing data. The processor unit 1220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1240 may include a system bus, LDT, PCI, ISA, or other types of buses, and the communications or network interface may, for example, be an Ethernet interface, a Frame Relay interface, or other interface. The network interface 1230 may be configured to enable a system component to communicate with other system components across a network which may be a wireless or various other networks. It should be noted that one or more components of computing device 1200 may be located remotely and accessed via a network. Accordingly, the system configuration provided in FIG. 12 is provided to generally illustrate how embodiments may be configured and implemented.

Method embodiments or certain steps thereof, may be embodied in a computer program product such as an application that can be downloaded to a customer or user computing device. Method embodiments or certain steps thereof may also be carried out by execution of software instructions that are embodied in, or readable from, a non-transitory, tangible medium or computer-readable medium or carrier or article of manufacture, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1220 performs steps or executes program instructions 1212 within memory 1210 and/or embodied on the carrier to implement method embodiments.

Although certain embodiments have been shown and described, it will be understood that the above discussion does not limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, it will be appreciated that embodiments provide various technological improvements and advantages. For example, embodiment data structures, connectivity and associated processing provide for improved flexibility and adaptability to specification modifications and new or deleted product specifications. For example, a given product specification may tagged for inclusion in multiple specification family records or referenced pointers of multiple specification family records for different groups of products to generate respective electronic BOMs, while changes to a single product specification may be automatically propagated to different specification family records for different groups of products and to different electronic BOMs generated based on those updated specification family records. Such flexibility and adaptability are further demonstrated in implementations involving geographically distributed user computing systems or when certain employees may not be aware of updates executed by other employees.

Scalability improvements provided by embodiments will be readily appreciated since embodiments can be used for hundreds, thousands, millions of accounts for various products and customers, while providing a cooperative platform for customer and third party (such as supplier and manufacturer) collaboration.

Embodiments also provide various efficiency improvements not only in terms of data storage efficiency by safeguarding against unnecessary storage of duplicate product specifications, reducing or eliminating other processing, interactions and accessing or reading of such duplicate product specifications, and generating specification family record data structures with pointers to associated product specifications, but also efficiencies for electronic BOM generation and propagation of updates to specification family records and electronic BOMs.

Embodiment efficiencies, flexibility and adaptability are also demonstrated by the ability to define, customize and change rules, criteria or thresholds for determining whether a new or additional product specification is duplicate or non-duplicate. For example, for a particular product, a currently stored specification may specify a particular dimension of 24" whereas an additional product specification that is received specifies a dimension of 27". Depending on tolerances, the difference of 3" may be specified by rules, criteria or threshold as triggering a determination by the specification management application that the additional product specification is a duplicate (if 3" is an acceptable difference), or as a non-duplicate, new product specification if that different is too large. Such rules, criteria or thresholds may govern various product dimensions, and various product attributes whether dimension, collective dimensions/shapes, ingredient composition, color, etc.

Further, it will be particularly appreciated that embodiments provide various technological improvements and advantages in terms of efficiencies, flexibility, adaptability and scalability and accuracy when improvements and advantages discussed above and throughout the specification are considered in combination.

Moreover, given the technical and computer and network centric nature of embodiments as claimed, described and illustrated, claimed embodiments are not considered to encompass any human action and are not intended to encompass any human process or manual or mental human activity.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. Accordingly, embodiments are intended to exemplify alternatives, modifications, and equivalents that may fall within the scope of the claims.

What is claimed is:

1. A computerized method for generating an electronic bill of material (BOM), comprising:
   a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:
   receiving electronic product specifications from at least one computing device of the plurality of computing devices through at least one communication network;
   executing a parser on one or more received electronic product specifications to format the one or more received electronic product specifications for processing by the specification management application and determining respective product attributes of the one or more electronic product specifications;
   storing electronic product specifications including respective product attributes to the data store;
   identifying duplicate electronic product specifications stored in the data store;
   deleting identified duplicate electronic product specifications from the data store;

identifying non-duplicate electronic product specifications that define common attributes of multiple products of the product family;

generating an electronic specification family record based at least in part on the identified, non-duplicate electronic product specifications, the electronic specification family record comprising a data structure of connected electronic product specifications defining product attributes that are applicable to multiple products of the product family;

storing the electronic specification family record to the data store;

reading or receiving the electronic specification family record stored in the data store;

reading or receiving independent electronic product specifications that are separate from the electronic product specifications and the electronic specification family record, respective independent electronic product specifications defining respective attributes applicable to a product of the product family but not included in the electronic specification family record; and generating respective electronic BOMs for respective products for a user of the specification management application, wherein an electronic BOM is generated by the specification management application aggregating electronic product specifications of the electronic specification family record and at least one independent electronic product specification such that the electronic BOM includes respective product attributes defined by respective connected electronic product specifications of the electronic specification family record and at least one product attribute defined by at least one electronic product specification of at least one independent electronic product specification.

2. The computerized method of claim 1, the specification management application generating a first electronic BOM for a first product of the product family by aggregating data of:

the electronic specification family record, a first independent electronic product specification that defines a product attribute that is applicable to the first product but is not part of the electronic specification family record; and a second independent electronic product specification that defines a product attribute that is applicable to the first product but is not part of the electronic specification family record and is different from the product attribute defined by the first independent electronic product specification, the first electronic BOM comprising:

respective product attributes defined by respective connected electronic product specifications of the electronic specification family record, at least one product attribute defined by the first independent electronic product specification, and at least one product attribute defined by the second independent electronic product specification.

3. The computerized method of claim 2, the specification management application generating a second electronic BOM for a second product of the product family by aggregating data of:

the electronic specification family record, the first independent electronic product specification, and a third independent electronic product specification that defines a product attribute that is applicable to the second product but is not part of the electronic specification family record and is different from the product attributes defined by the first and second independent electronic product specifications, the second electronic BOM comprising:

respective product attributes defined by respective connected electronic product specifications of the electronic specification family record, at least one product attribute defined by the first independent electronic product specification, and at least one product attribute defined by the independent electronic product specification.

4. The computerized method of claim 1, further comprising the specification management application accessing the data store and reading or receiving a second electronic specification family record stored in the data store, the second electronic specification family record comprising a second data structure of connected electronic product specifications defining product attributes that are applicable to multiple products of the product family.

5. The computerized method of claim 4, wherein the electronic BOM is generated by the specification management application aggregating data of the first electronic specification family record, the second electronic specification family record, and at least one independent electronic product specification such that the electronic BOM specifies respective product attributes defined by respective connected electronic product specifications of respective first and second electronic specification family records and at least one product attribute defined by the at least one independent electronic product specification.

6. The computerized method of claim 1, wherein a first electronic BOM is generated for a first product of the product family and a second electronic BOM is generated for a second product of the product family, the first electronic BOM comprising:

product specifications of the electronic specification family record, and a first independent electronic product specification defining a first product attribute unique to the first product and not included in the electronic specification family record, and the second electronic BOM comprising:

product specifications of the electronic specification family record, and a second independent electronic product specification defining a second product attribute unique to the second product and not included in the electronic specification family record or the first independent electronic product specification.

7. The computerized method of claim 1, wherein an electronic product specification of the electronic specification family record is a product specification of multiple electronic specification family records.

8. The computerized method of claim 1, wherein an electronic product specification of the electronic specification family record is also an independent electronic product specification of a second electronic BOM for a different product of a different product family.

9. The computerized method of claim 1, wherein the at least one independent electronic product specification that is included in the electronic BOM is a product specification of a different electronic specification family record for a different product of a different product family.

10. The computerized method of claim 1, wherein the at least one independent electronic product specification defines a product attribute for the electronic BOM that is selected or specified by the user of the specification management application.

11. The computerized method of claim 1, the data store comprising:
a first database including product specifications, and
a second database including electronic specification family records comprising respective pointers to respective flags or indicators of respective product specifications stored in the first database.

12. The computerized method of claim 11, wherein each account hosted by the specification management application includes a first database of electronic product specifications associated with the account and a second database of generated electronic specification family records for the account.

13. The computerized method of claim 12, wherein each account hosted by the specification management application includes a third database of independent electronic product specifications selected by a user of the specification management application to be included in an electronic BOM.

14. The computerized method of claim 1, wherein a first user has a first account with the specification management application and the first user, by a first computing device, accesses the specification management application through a first communications network, and a second user different from the first user has a second account with the specification management application, and by a second computing device, accesses the specification management application through a second communications network, wherein the specification management application executes computer-readable instructions to generate respective BOMs for respective products of respective first and second users.

15. The computerized method of claim 1, respective electronic BOMs being generated by the specification management application executing bottom up design without the product being initially specified.

16. The computerized method of claim 1, the data structure of the electronic specification family record comprising a plurality of linked objects or tables of a relational database system.

17. The computerized method of claim 1, wherein the specification management application executing as the cloud computing resource is accessed by respective user computers through respective communication networks to generate respective electronic BOMs for respective product families of respective users.

18. The computerized method of claim 1, further comprising the specification management application:
receiving an electronic document from a computing device of a user of the specification management application, and
linking the electronic document to at least one of the electronic BOM, the electronic specification family record, and a product specification of the electronic specification family record.

19. The computerized method of claim 18, herein the electronic document is a word processing document, a .pdf document, an electronic image or a spreadsheet file.

20. The computerized method of claim 1, wherein specification management application identifies electronic product specifications that define common attributes of multiple products before storing the received electronic product specifications to the data store.

21. The computerized method of claim 1, wherein the specification management application receives the plurality of electronic product specifications through a communications network from a single computing device.

22. The computerized method of claim 1, wherein the specification management application receiving the plurality of electronic product specifications comprises:
receiving, through a first communication network, a first plurality of electronic product specifications from a first computing device, and
receiving, through a second communication network, a second plurality of electronic product specifications from a second computing device.

23. The computerized method of claim 22, wherein the first computing device is at a first geographic location and the second computing device is at a second location different from the first geographic location, the data store includes an aggregated product specification set comprising electronic product specifications received from the first user computing device and electronic product specifications received from the second user computing device, and the electronic specification family record is generated by the specification management application based at least in part upon the aggregated product specification set stored in the data store.

24. The computerized method of claim 1, further comprising the specification management application:
receiving additional electronic product specifications from at least one computing device of the plurality of computing devices through at least one communication network;
executing the parser on one or more additional electronic product specifications to format the one or more additional electronic specifications for processing by the specification management application and determining respective product attributes of the one or more additional electronic product specifications processed by the parser;
accessing the stored electronic product specifications;
executing a comparison of the stored electronic product specifications and the one or more additional electronic product specifications;
determining whether any additional electronic product specifications are duplicates of electronic product specifications already stored in the data store;
updating the data store by storing an additional electronic product specification that is a non-duplicate electronic product specification to the data store; and
presenting, through a computer generated user interface and to the user of the specification management application, an alert that an additional electronic product specification is a duplicate electronic product specification to a user of the specification management application, wherein the duplicate electronic product specification is not stored to the data store.

25. The computerized method of claim 24, wherein electronic product specifications stored to the data store are received through a first communication network from a first computing device, and additional electronic product specifications are received through a second communication network from a second computing device.

26. The computerized method of claim 25, wherein the first computing device is at a first geographic location and the second computing device is at a second location different from the first geographic location, and wherein
the specification management application receives a first plurality of electronic product specifications from the first computing device and stores the first plurality of electronic product specifications to the data store, receives the second plurality of electronic product specifications from the second user computing device and storing the second plurality of electronic product specifications to the data store, and generates an aggregated specification set by combining the first plurality of electronic product specifications and the second plurality of electronic product specifications, wherein the electronic specification family record is generated based on the aggregated specification set.

27. The computerized method of claim 24, receiving additional electronic product specifications comprising the specification management application receiving an additional electronic product specification that is manually entered by the user of the specification management application through the user computing device, wherein the alert is presented to the user of the specification management application through a computer generated user interface during manual entry of the additional electronic product specification by the user of the specification management application.

28. The computerized method of claim 24, further comprising the specification management application
receiving an updated electronic product specification for a product specification stored in the data store; and
replacing the stored electronic product specification with the updated electronic product specification; and
updating an electronic BOM based on the updated electronic product specification.

29. The computerized method of claim 28, wherein an electronic specification family record is updated.

30. The computerized method of claim 28, wherein an independent electronic product specification is updated.

31. The computerized method of claim 28, wherein the stored electronic product specification is updated or replaced with the updated electronic product specification based on a difference between a product attribute of the updated electronic product specification and the product attribute of the stored electronic product specification being greater than a pre-determined threshold.

32. The computerized method of claim 28, wherein the electronic BOM is updated automatically by the specification management application.

33. The computerized method of claim 1,
wherein electronic product specifications are received by a buffer or temporary data store, further comprising:
identifying duplicate electronic product specifications in the buffer or temporary data store;
deleting identified electronic duplicate product specifications from the buffer or temporary data store; and
storing the non-duplicate electronic product specifications to the data store, wherein non-duplicate electronic product specifications that define common attributes of multiple products of the product family are identified for generation of the electronic specification family record.

34. The computerized method of claim 1, further comprising the specification management application presenting the electronic BOM through a computer-generated user interface to the user of the specification management application.

35. The computerized method of claim 34, wherein the specification management application does not present the data structure of the electronic specification family record to the user through the interactive user interface.

36. The computerized method of claim 1, further comprising the specification management application, by the intermediate computing system, transmitting the generated electronic BOM through respective communication networks to respective user and third party computing devices.

37. The computerized method of claim 1, further comprising the specification management application presenting, through a computer generated user interface and to the user of specification management application, an alert that an electronic product specification was identified as a duplicate electronic product specification.

38. The computerized method of claim 1, executing the parser comprising executing an an Extensible Markup Language (XML) parser on the received electronic product specifications.

39. The computerized method of claim 1, wherein the parser is executed on received electronic product specifications of a pre-determined format.

40. The computerized method of claim 1, wherein the specification management application executed by the intermediate computing system provides for collaborative electronic BOM generation.

41. The computerized method of claim 1, wherein no processing by the cloud computing resource comprising the specification management application is performed by a human or performed in a human mind.

42. A computerized method for generating an electronic bill of material (BOM), comprising:
a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:
receiving electronic product specifications from at least one computing device of the plurality of computing devices through at least one communication network;
executing a parser on one or more received electronic product specifications to format the one or more received electronic product specifications for processing by the specification management application and determining respective product attributes of the one or more electronic product specifications;
storing electronic product specifications including respective product attributes to the data store;
generating an electronic specification family record, the electronic specification family record comprising a data structure of connected electronic product specifications defining product attributes that are applicable to multiple products of a product family;
storing the electronic specification family record to the data store;
reading or receiving independent electronic product specifications that are separate from the electronic product specifications and the electronic specification family record, respective independent electronic product specifications defining respective attributes applicable to a product of the product family but not included in the electronic specification family record; and
generating respective BOMs for respective products of a user of the specification management application, wherein an electronic BOM is generated by the specification management application aggregating electronic product specifications of the electronic specification family record and at least one independent electronic product specification such that the electronic BOM includes respective product attributes defined by respective connected electronic product specifications of the electronic specification family record and at least one product attribute defined by at least one electronic product specification of at least one independent electronic product specification, wherein the specification management application generates a first electronic BOM for a first product of the product family by aggregating data of:
the electronic specification family record,
a first independent electronic product specification that defines a product attribute that is applicable to the first product but is not part of the electronic specification family record; and
a second independent electronic product specification that defines a product attribute that is applicable to the first product but is not part of the electronic specification family record and is different from the product attribute defined by the first independent electronic product specification; and
the first electronic BOM comprising:
respective product attributes defined by respective connected electronic product specifications of the electronic specification family record,
at least one product attribute defined by the first independent electronic product specification, and
at least one product attribute defined by the second independent electronic product specification.

43. A computerized method for generating an electronic bill of material (BOM), comprising:
a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:
receiving electronic product specifications from at least one computing device of the plurality of computing devices through at least one communication network;
executing a parser on one or more received electronic product specifications to format the one or more received electronic product specifications for processing by the specification management application and determining respective product attributes of the one or more electronic product specifications processed by the parser;
storing electronic product specifications including respective product attributes to the data store;
generating a plurality of electronic specification family records, each electronic specification family record comprising a data structure of connected electronic product specifications defining product attributes that are applicable to multiple products of a product family;
storing the electronic specification family record to the data store;
reading or receiving a first electronic specification family record stored in a data store and a second electronic specification family record stored in the data store, the first electronic specification family record comprising a first data structure of connected electronic product specifications defining product attributes that are applicable to multiple products of a product family, and the second electronic specification family record comprising a second data structure of connected electronic product specifications defining product attributes that are applicable to multiple products of the product family;
reading or receiving independent electronic product specifications that are separate from the electronic product specifications, the first and second electronic specification family records, respective independent electronic product specifications defining respective attributes applicable to a product of the product family but not included in the first electronic specification family record; and
generating respective electronic BOMs for respective products for an user of the specification management application, wherein an electronic BOM is generated by the specification management application aggregating electronic product specifications of the first and second electronic specification family records and at least one independent electronic product specification such that the electronic BOM specifies respective product attributes defined by respective connected electronic product specifications of respective first and second electronic specification family records and at least one product attribute defined by the at least one independent electronic product specification.

44. A computerized method for generating an electronic bill of material (BOM), comprising:
a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:
receiving electronic product specifications from at least one computing device of the plurality of computing devices through at least one communication network;
executing a parser on one or more received electronic product specifications to format the one or more received electronic product specifications for processing by the specification management application and determining respective product attributes of the one or more electronic product specifications;
storing electronic product specifications including respective product attributes to the data store;
generating an electronic specification family record, the electronic specification family record comprising a data structure of connected electronic product specifications defining product attributes that are applicable to multiple products of a product family;
storing the electronic specification family record to the data store;
reading or receiving an electronic specification family record stored in the data store;
reading or receiving independent electronic product specifications that are separate from the electronic product specifications and the electronic specification family record, respective independent electronic product specifications defining respective attributes applicable to a product of the product family but not included in the electronic specification family record; and
generating respective electronic BOMs for respective products for a user of the specification management application, wherein an electronic BOM is generated by the specification management application aggregating electronic product specifications of the electronic specification family record and at least one independent electronic product specification such that the electronic BOM includes respective product attributes defined by respective connected electronic product specifications of the electronic specification family record and at least one product attribute defined by at least one electronic product specification of at least one independent electronic product specification, wherein a first electronic BOM is generated for a first product of the product family and a second electronic BOM is generated for a second product of the product family, the first electronic BOM comprising: electronic product specifications of the electronic specification family record, and a first independent electronic product specification defining a first product attribute unique to the first product and not included in the electronic specification family record, and a second electronic BOM is generated for a second product of the product family the second electronic BOM comprising: electronic product specifications of the electronic specification family record, and a second independent electronic product specification defining a second product attribute unique to the second product and not included in the electronic specification family record or the first independent electronic product specification.

45. A computerized method for generating an electronic bill of material (BOM), comprising:

a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:

receiving a plurality of electronic product specifications, wherein at least one electronic product specification is received through a first communication network from a first computing device, and at least one electronic product specification is received through a second communication network from a second computing device, and wherein the first computing device is at a first geographic location and the second computing device is at a second location different from the first geographic location;

executing a parser on one or more received electronic product specifications to format the one or more received electronic specifications for processing by the specification management application and determining respective product attributes of the one or more electronic product specifications;

storing the plurality of electronic product specifications including respective product attributes to the data store, wherein the data store includes an aggregated product specification set comprising one or more electronic product specifications received from the first user computing device and one or more electronic product specifications received from the second user computing device;

identifying electronic product specifications of the aggregated product specification set that define common attributes of multiple products of the product family;

generating the electronic specification family record, wherein the specification family record is generated based at least in part upon the identified electronic product specifications of the aggregated product specification set in the data store;

storing the electronic specification family record to the data store;

reading or receiving an electronic specification family record stored in a data store, the electronic specification family record comprising a data structure of connected electronic product specifications defining product attributes that are applicable to multiple products of a product family;

reading or receiving independent electronic product specifications that are separate from the electronic product specifications and the electronic specification family record, respective independent electronic product specifications defining respective attributes applicable to a product of the product family but not included in the electronic specification family record; and generating respective electronic BOMs for respective products for a user of the specification management application, wherein an electronic BOM is generated by the specification management application aggregating electronic product specifications of the electronic specification family record and at least one independent electronic product specification such that the electronic BOM includes respective product attributes defined by respective connected electronic product specifications of the electronic specification family record and at least one product attribute defined by at least one electronic product specification of at least one independent electronic product specification.

46. The computerized method of claim 45, wherein the specification management application identifies electronic product specifications that define common attributes of multiple products before storing the received electronic product specifications to the data store.

47. A computerized method for generating an electronic bill of material (BOM), comprising:

a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:

receiving electronic product specifications from at least one computing device of the plurality of computing devices through at least one communication network;

executing a parser on one or more received electronic product specifications to format the one or more received electronic specifications for processing by the specification management application and determining respective product attributes of the one or more electronic product specifications;

storing the received electronic product specifications including respective product attributes to the data store;

identifying electronic product specifications that define common attributes of multiple products of the product family;

generating an electronic specification family record, wherein the specification family record is generated based at least in part upon the identified electronic product specifications;

storing the electronic specification family record to the data store;

receiving additional electronic product specifications;

accessing the stored electronic product specifications;

executing a comparison of the stored electronic product specifications and the received additional electronic product specifications;

determining whether any received additional electronic product specifications are duplicates of electronic product specifications already stored in the data store;

updating the data store by storing an additional electronic product specification that is a non-duplicate electronic product specification to the data store;

presenting, through a computer generated user interface and to a user of the specification management application, an alert that an additional electronic product specification is a duplicate electronic product specification, wherein the duplicate electronic product specification is not stored to the data store;

reading or receiving an electronic specification family record stored in a data store, the electronic specification family record comprising a data structure of connected electronic product specifications defining product attributes that are applicable to multiple products of a product family;

reading or receiving independent electronic product specifications that are separate from the electronic product specifications and the electronic specification family record, respective independent electronic product specifications defining respective attributes applicable to a product of the product family but not included in the electronic specification family record; and generating respective electronic BOMs for respective products for a user of the specification management application, wherein an electronic BOM is generated by the specification management application aggregating product specifications of the electronic specification family record and at least one independent electronic product specification such that the electronic BOM includes respective product attributes defined by respective connected electronic product specifications of the electronic specification family record and at least one product attribute defined by at least one product specification of at least one independent electronic product specification.

48. The computerized method of claim 47, further comprising the specification management application:
receiving an updated electronic product specification for a product specification in the data store;
replacing the stored electronic product specification with the updated electronic product specification; and
updating an electronic BOM based on the updated product specification.

49. The computerized method of claim 48, wherein an electronic specification family record is updated.

50. The computerized method of claim 48, wherein an independent electronic product specification is updated.

51. The computerized method of claim 48, wherein the stored electronic product specification is updated or replaced with the updated electronic product specification based on a difference between a product attribute of the updated electronic product specification and the product attribute of the stored electronic product specification being greater than a pre-determined threshold.

52. The computerized method of claim 48, wherein the electronic BOM is updated automatically by the specification management application.

53. A computerized method for generating an electronic bill of material (BOM), comprising:
a specification management application comprising computer-readable instructions of a cloud computing resource stored in a non-transitory memory and executed by a processor of a computing device of an intermediate computing system in communication with a plurality of computing devices comprising respective user and third party computing devices through respective communications networks:
receiving electronic product specifications from at least one computing device of the plurality of computing devices through at least one communication network and into a buffer or temporary data store;
identifying duplicate electronic product specifications in the buffer or temporary data store;
deleting identified duplicate electronic product specifications from the buffer or temporary data store;
executing a parser on one or more received, non-duplicate electronic product specifications to format the one or more received, non-duplicate electronic specifications for processing by the specification management application and determining respective product attributes of the one or more received non-duplicate electronic product specifications;
storing the non-duplicate electronic product specifications to a data store;
generating an electronic specification family record, wherein non-duplicate electronic product specifications that define common attributes of multiple products of the product family are identified for generation of the electronic specification family record;
storing the electronic specification family record to the data store;
reading or receiving the electronic specification family record stored in the data store, the electronic specification family record comprising a data structure of connected electronic product specifications defining product attributes that are applicable to multiple products of a product family;
reading or receiving independent electronic product specifications that are separate from the product specifications and the electronic specification family record, respective independent electronic product specifications defining respective attributes applicable to a product of the product family but not included in the electronic specification family record; and
generating respective electronic BOMs for respective products for a user of the specification management application, wherein an electronic BOM is generated by the specification management application aggregating electronic product specifications of the electronic specification family record and at least one independent electronic product specification such that the electronic BOM includes respective product attributes defined by respective connected product specifications of the electronic specification family record and at least one product attribute defined by at least one product specification of at least one independent electronic product specification.

54. The computerized method of claim 53, further comprising the specification management application presenting, through a computer generated user interface and to the user of the specification management application, an alert that an electronic product specification was identified as a duplicate electronic product specification.

\* \* \* \* \*